(12) United States Patent
Pombo et al.

(10) Patent No.: US 9,417,660 B2
(45) Date of Patent: Aug. 16, 2016

(54) COLLAPSIBLE HEAD SET COMPUTER

(71) Applicant: Kopin Corporation, Westborouogh, MA (US)

(72) Inventors: Stephen A. Pombo, Campbell, CA (US); Jeffrey J. Jacobsen, Hollister, CA (US); Temujin W. Kuechle, Santa Cruz, CA (US); Raphael Hebert, Santa Cruz, CA (US); David Diepersloot, Scotts Valley, CA (US); David Bruce Ferguson, Boca Raton, FL (US)

(73) Assignee: Kopin Corporation, Westborough, MA (US)

( * ) Notice: Subject to any disclaimer, the term of this patent is extended or adjusted under 35 U.S.C. 154(b) by 166 days.

(21) Appl. No.: 13/843,124

(22) Filed: Mar. 15, 2013

(65) Prior Publication Data

US 2013/0285886 A1 Oct. 31, 2013

Related U.S. Application Data

(60) Provisional application No. 61/638,419, filed on Apr. 25, 2012, provisional application No. 61/733,391, filed on Dec. 4, 2012.

(51) Int. Cl.
*G09G 5/00* (2006.01)
*G06F 1/16* (2006.01)
*G02B 27/01* (2006.01)

(52) U.S. Cl.
CPC ............ *G06F 1/163* (2013.01); *G02B 27/0149* (2013.01); *G02B 27/0176* (2013.01); *G02B 2027/0138* (2013.01); *Y10T 29/49002* (2015.01); *Y10T 29/49117* (2015.01)

(58) Field of Classification Search
CPC ................... G02B 27/0149; G02B 2027/0138; G02B 27/0176; Y10T 29/49002; Y10T 29/49117; G06F 1/163

USPC ............................................................. 345/8
See application file for complete search history.

(56) References Cited

U.S. PATENT DOCUMENTS 4,571,746 A * 2/1986 Gorike .............................. 2/209
5,486,841 A 1/1996 Hara et al.
(Continued)

OTHER PUBLICATIONS

International Preliminary Report on Patentability, International Application No. PCT/US2013/036403, filed on Apr. 12, 2013, "Collapsible Head Set Computer," date of communication: Oct. 28, 2014.
(Continued)

*Primary Examiner* — Charles Hicks
(74) *Attorney, Agent, or Firm* — Hamilton, Brook, Smith & Reynolds, P.C.

(57) ABSTRACT

In one embodiment, collapsible head mounted computer (CHMC) transforms between a collapsed and headset form via joints embedded in the structure of the headset. Joints can be in the back or sides of the CHMC. The CHMC in the headset form is configured to be mounted on the user's head. The headset form presents the display in front of the user's eye, or in the peripheral vision of the user's eye. The CHMC in the collapsed form is designed to minimize empty space to fill a smaller volume. In this manner, the CHMC can be stored away easily. The CHMC may also include an electronics module enabling onboard processing or an onboard power source to operate electronics modules and a display without an outside electrical connection. The CMHC may also employ near field communication on circuit board near joints to allow for communication regardless of the form of the device.

22 Claims, 23 Drawing Sheets

(56) References Cited

U.S. PATENT DOCUMENTS

| | | | |
|---|---|---|---|
| D375,495 S | 11/1996 | MacIness et al. | |
| D380,482 S | 7/1997 | Shimasaki et al. | |
| D383,455 S | 9/1997 | MacIness et al. | |
| 5,742,263 A | 4/1998 | Wang | |
| D427,982 S | 7/2000 | Ishii | |
| D444,155 S | 6/2001 | Morooka et al. | |
| 6,421,031 B1 | 7/2002 | Ronzani | |
| 6,560,029 B1 | 5/2003 | Dobbie | |
| 6,654,966 B2 * | 12/2003 | Rolla | 2/209 |
| D538,269 S | 3/2007 | Tragatschnig | |
| D702,234 S | 4/2014 | Pombo et al. | |
| D713,406 S | 9/2014 | Pombo et al. | |
| 2004/0136522 A1 | 7/2004 | Wurtz | |
| 2005/0015008 A1 | 1/2005 | Munn | |
| 2005/0046549 A1 | 3/2005 | Hoyle | |
| 2007/0089221 A1 | 4/2007 | Manzella | |
| 2009/0085833 A1 | 4/2009 | Otsuki | |
| 2009/0099836 A1 | 4/2009 | Jacobsen | |
| 2009/0117890 A1 | 5/2009 | Jacobsen | |
| 2009/0154719 A1 | 6/2009 | Wulff et al. | |
| 2009/0160737 A1 * | 6/2009 | Wu et al. | 345/8 |
| 2009/0243970 A1 | 10/2009 | Kato et al. | |
| 2009/0251409 A1 | 10/2009 | Parkinson | |
| 2011/0004979 A1 | 1/2011 | VanDerWoude | |
| 2011/0085135 A1 | 4/2011 | Bertolli | |
| 2011/0089207 A1 * | 4/2011 | Tricoukes et al. | 224/181 |
| 2011/0187640 A1 | 8/2011 | Jacobsen | |
| 2011/0249122 A1 | 10/2011 | Tricoukes et al. | |
| 2012/0068914 A1 | 3/2012 | Jacobsen et al. | |
| 2012/0143020 A1 | 6/2012 | Bordoley | |
| 2012/0287284 A1 | 11/2012 | Jacobsen | |
| 2013/0237146 A1 | 9/2013 | Serota | |
| 2013/0285886 A1 | 10/2013 | Pombo | |
| 2013/0300649 A1 | 11/2013 | Parkinson | |
| 2013/0326208 A1 | 12/2013 | Jacobsen | |
| 2014/0031001 A1 | 1/2014 | Jacobsen | |
| 2014/0137197 A1 * | 5/2014 | Lazaridis et al. | 726/3 |
| 2014/0153173 A1 | 6/2014 | Pombo et al. | |
| 2014/0187179 A1 | 7/2014 | Ferguson | |
| 2014/0233108 A1 | 8/2014 | Cazalet | |
| 2014/0270234 A1 | 9/2014 | Beal | |
| 2014/0320383 A1 | 10/2014 | Goto | |
| 2014/0337621 A1 | 11/2014 | Nakhimov | |
| 2015/0138224 A1 | 5/2015 | Kim | |
| 2015/0156803 A1 | 6/2015 | Ballard | |
| 2015/0168727 A1 | 6/2015 | Qaddoura | |
| 2015/0173666 A1 | 6/2015 | Smith | |
| 2015/0220142 A1 | 8/2015 | Parkinson | |
| 2015/0223355 A1 | 8/2015 | Fleck | |
| 2015/0235426 A1 | 8/2015 | Lyons | |
| 2015/0241917 A1 | 8/2015 | Seok | |
| 2015/0243068 A1 | 8/2015 | Solomon | |
| 2015/0265161 A1 | 9/2015 | Hernandez | |
| 2015/0319546 A1 | 11/2015 | Sprague | |
| 2016/0005233 A1 | 1/2016 | Fraccaroli | |
| 2016/0007935 A1 | 1/2016 | Hernandez | |
| 2016/0026253 A1 | 1/2016 | Bradski | |
| 2016/0026870 A1 | 1/2016 | Wexler | |
| 2016/0035136 A1 | 2/2016 | Sendai | |

OTHER PUBLICATIONS

Notification and Transmittal of the International Search Report and Written Opinion of PCT/US2013/036403 entitled "Collapsible Head Set Computer" dated Jul. 3, 2013.

International Search Report, issued in International Application No. PCT/US2013/072867, entitled "Spring-Loaded Supports for Head Set Computer," Mailing Date of Search Sep. 1, 2014.

International Preliminary Report on Patentability, International Application No. PCT/US2013/072867, filed on Dec. 3, 2013, "Spring-Loaded Supports for Head Set Computer," date of communication: Jun. 9, 2015.

* cited by examiner

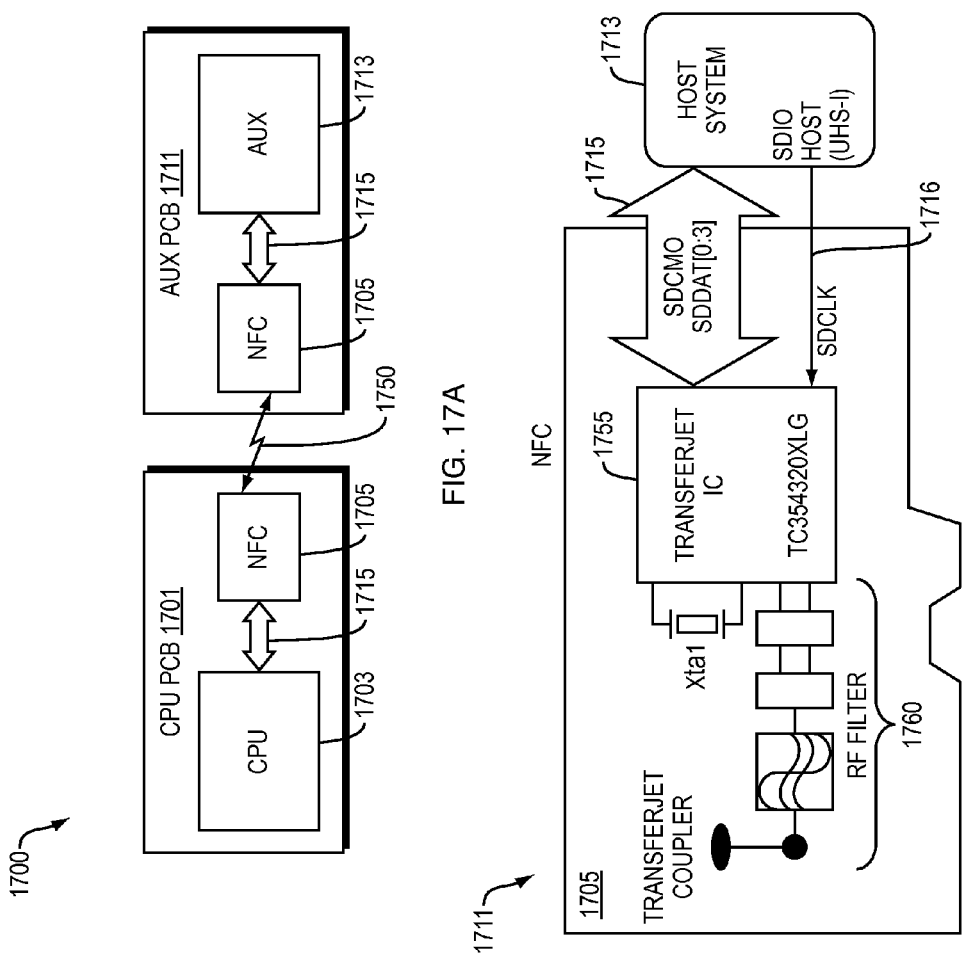

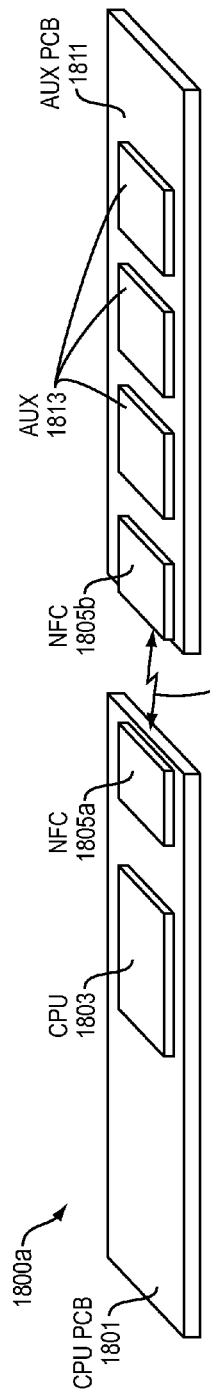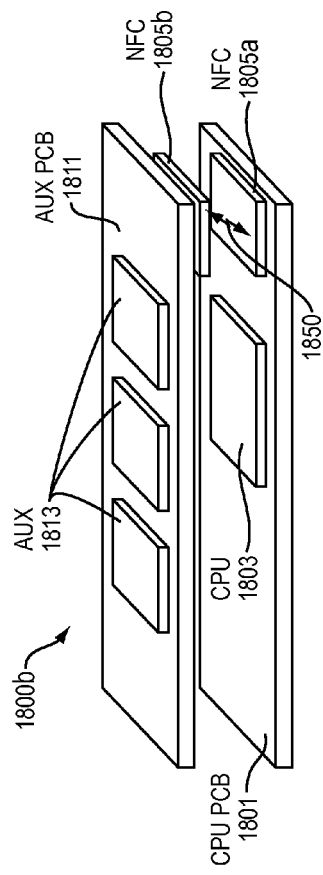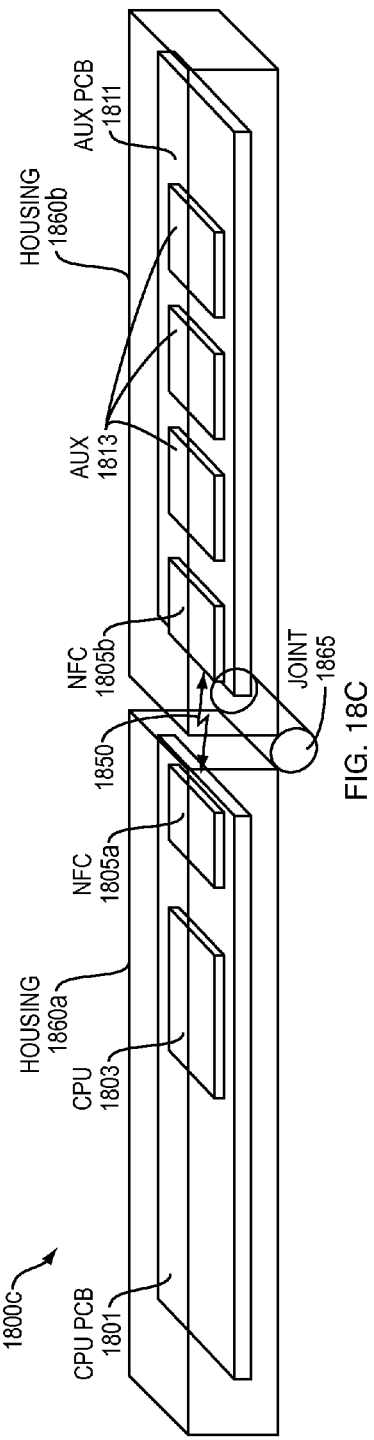

COLLAPSIBLE HEAD SET COMPUTER

RELATED APPLICATIONS

This application claims the benefit of U.S. Provisional Application No. 61/733,391, filed on Dec. 4, 2012 and U.S. Provisional Application No. 61/638,419, filed on Apr. 25, 2012.

The entire teachings of the above applications are incorporated herein by reference.

BACKGROUND

A head mounted computer has a display and is mounted to a user's head to enable the user to view the display. The display shows images to the user, for example, from a computer or a remote device. The user can control the head mounted computer or another remote device, which in turn affects the images shown on the display.

SUMMARY

Head mounted computers are bulky systems which, due to their shape necessary for head-mounted operation, are difficult to store or operate by hand when not mounted to the user's head. In one embodiment, the present head mounted computer overcomes these shortcomings of the prior art by providing an articulating support beam to secure a display unit to a user's head, whereby the joints of the support beam can be used to collapse the head mounted computer into a more compact configuration when removed from the user's head and still allow the user to view the display.

In an example embodiment of the present invention, a collapsible head mounted computer (or collapsible headset/ head worn computer) can include a head support beam including two ends and at least one joint to enable articulation between a collapsed form and a headset form. The head support beam, in its headset form, can be configured to wrap around a portion of a user's head. The portion can be any area of a user's head sufficient to secure the head support beam using an attachment means or existing head or eyewear on the user. In this position, the two ends of the head support beam can be located at the front of the user's head, with each of the two ends being on opposite sides of the user's head. The location of the two ends can be on the outside of the user's head and adjacent to the user's left and right eye, respectively. When in collapsed form, by articulating the joint or joints of head support beam, the two ends of the head support beam can be placed closer together than in the headset form. A display support beam can be attached to the head support beam at one end of the display support beam. A display unit can be attached to the other end of the display support beam. In one embodiment, the portion of the head covered by the support beam can be either the back or top of the user's head. In another embodiment, the portion of the user's head wrapped by the support beam can include the top or back of the user's head, or any portion between the top and back.

In one embodiment, the head mounted computer can be converted between the collapsed form and the headset form via joints embedded in the structure of the headset. Joints can be at least in the back of the headset or the sides of the headset to fold it into a small compact volume. The head mounted computer in the headset form is configured to be mounted on the user's head, like a head mounted computer that holds a wearable computing headset. The headset form can present the display in front of the user's eye, or in the peripheral vision of the user's eye. The headset in the collapsed form can minimize empty space to fill a smaller volume. In this manner, the physical structure of the headset itself can be stored away easily (e.g., in a pocket). The collapsible headset in the folded form can be similar to a mobile/cellular phone because can be used as a handheld device. In another embodiment, the collapsible headset in the folded form can be arranged such that it surrounds a client device (e.g., cellular phone, smart device, tablet, etc.), so the headset in the collapsed form is a case of the client device. After being converted to the collapsed form, the headset can be converted to the headset form again to be worn as a head mounted computer.

In another embodiment, the collapsible head mounted computer can include an electronics module with a processor and a memory coupled to the head support beam. In another embodiment, a power source module can be coupled to the head support beam.

In another embodiment, a support device can be attached to the head support beam to secure the head support beam to the user's head. The support device can be a strap, stabilizer, ear attachment, or meant to connect to existing eyewear.

In yet another embodiment, the head support beam can be further configured to have a folded form allowing hand-held operation of the display screen. In this configuration, the head set computer can be interfaced as a hand-held device with the same display unit as placed before the user's eyes in its mounted configuration.

In another embodiment, the head support beam and display support beams can be both of user adjustable length.

In another embodiment, the collapsible head mounted computer can further include a central processing printed circuit board (CPUPCB) including a central processing unit (CPU) operatively coupled to a first near field communications (NFC) module. The collapsible head mounted computer can further include an auxiliary printed circuit board (AUX-PCB) including one or more auxiliary modules operatively coupled to a second NFC module. The second NFC module can be arranged to be located within a near field range of the first NFC module. The first and second NFC modules can be configured to establish an NFC link, and the first and second NFC modules are housed by the head support beam and separated by the at least one joint.

The head mounted computer can also include at least two mounts. Each front can be at a corresponding front end of the head support beam. Each of the two mounts can be configured to mount an accessory. The accessory can include at least one of a camera, sensor, microphone, and illumination device.

The head mounted computer can also include at least two sliding stabilizer mounts. Each sliding stabilizer mount can be coupled to opposite sides of the head support beam. The sliding stabilizer mounts can be configured to slide along a defined slide path on the head support beam. The at least two sliding stabilizer mounts can include a brake or other locking mechanism.

In another embodiment, the head mounted computer includes at least two stabilizers. Each stabilizer can be configured to mount in a corresponding sliding stabilizer mount. Each stabilizer can be configured to move between an open position (e.g., an unsecured position, a moveable position) and a locked position (e.g., a secured position, a stationary position). The open position can unlock the brake of the corresponding sliding stabilizer mount such that the corresponding sliding stabilizer mount can change its position on the defined slide path. The locked position can lock the brake of the corresponding sliding stabilizer mount such that the corresponding sliding stabilizer mount locks its position on the defined slide path.

In another embodiment, a stabilizer can support the head mounted computer by wrapping around the user's head. The stabilizer can also support the head mounted computer by clipping to a user's headwear or locking into a predefined receptacle in a user's headwear. The stabilizer can support the head mounted computer by supporting against the user's ear. The stabilizers can be removably connected to the stabilizer mounts.

In another embodiment, a head mounted computer includes a pressure mounting head support beam configured to wrap around a back of user's head, the pressure mounting head support beam including two ends, the two ends located at the front of the user's head, each of the two ends being on opposite sides of the user's head. The head mounted computer can include a display support beam configured to (a) couple with one of the two ends at a first end of the display support beam and (b) couple with a display at the second end of the display support beam. The head support beam can provide tension towards the user's head through the two ends, the tension supporting the head mounted computer. The support beam can also provide compression, pressure, inward tension, an inward force, or other force against the user's head.

The head mounted computer can further include a strap with two ends. Each end can be coupled to an opposite one of two mounts at each of the two ends. The strap can provide tension to the user's head to hold the head mounted computer in place. The strap can also provide compression, pressure, inward tension, an inward force, or other force against the user's head. The pressure mounting head support beam can have a radius of curvature that matches a radius of curvature of the user's head to enable retention of the head mounted computer on the user's head.

The pressure mounting head support beam can be configured to have a particular amount of elasticity (e.g., flexibility or adjustability) for mounting and dismounting the pressure mounting head support beam on the user's head.

In another embodiment, a method of displaying visual information to a user can include connecting a display to a first end of a display support beam. The method can further include coupling a second end of the display beam to a head support beam. The head support beam can include two ends and at least one joint to enable articulation of the head support beam between a collapsed form and a headset form. The head support beam in headset form can be configured to wrap around a portion of a user's head. The two ends can be located at the front of the user's head. Each of the two ends can be on opposite sides of the user's head. The head support beam in collapsed form can be configured to place the two ends closer together than the particular distance in headset form. The method can further include displaying visual information to the user on the display.

In another embodiment, the method can include operatively coupling a central processing printed circuit board (CPUPCB) including a central processing unit (CPU) to a first near field communications (NFC) module. The method can further include operatively coupling an auxiliary printed circuit board (AUXPCB) including one or more auxiliary modules to a second NFC module. The method can also include arranging the second NFC module to be located within a near field range of the first NFC module. The method can additionally include housing the first and second NFC modules are housed by the head support beam such that the first NFC module and second NFC module are separated by the at least one joint. The method can also include establishing an NFC link between the first NFC module and second NFC module.

In another embodiment, a computing device can include a central processing printed circuit board (CPUPCB) including a central processing unit (CPU) operatively coupled to a first near field communications (NFC) module. The computing device can further include an auxiliary printed circuit board (AUXPCB) including one or more auxiliary modules operatively coupled to a second NFC module. The second NFC module can be arranged to be located within a near field range of the first NFC module. The first NFC module and the second NFC module can be configured to establish a NFC link.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 17A-17B are high-level schematic diagrams illustrating example embodiments of electrical circuits employing near field communications that can be used to transfer data between electronics modules of a collapsible headset computer.

FIGS. 18A-18C are example arrangements of PCBs equipped with NFC modules.

DETAILED DESCRIPTION

A description of example embodiments of the invention follows.

Figure 1:
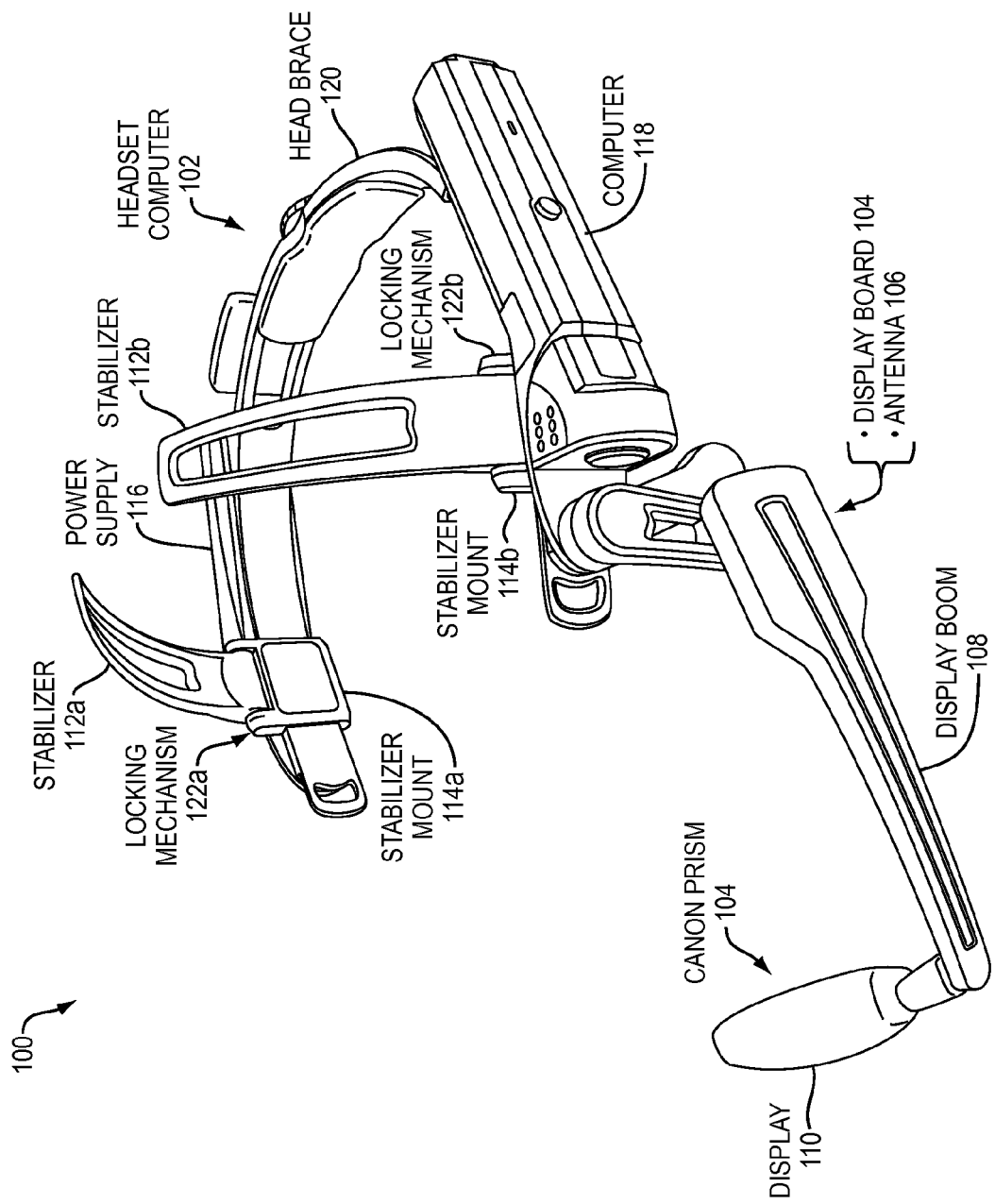
FIG. 1 is a diagram illustrating an example embodiment of a collapsible headset computer in headset mode.

FIG. 1 is a diagram 100 illustrating an example embodiment of a headset computer 102 in headset form. The headset computer 102 includes a computer 118, a power supply 116, and a display boom 118. The display boom further includes a display 110, a display board 104, and an antenna 106. The headset computer 102 can include additional electronics or antennas.

The headset computer 102 further includes stabilizer mounts 114a-b. The stabilizer mounts 114a-b are coupled to stabilizers 112a-b. The stabilizers 112a-b and the stabilizer mounts 114a-b are removable from the headset computer 102. The stabilizers 112a-b in FIG. 1 wrap around the top of the user's head without connecting to each other. However, other variations of stabilizers 112a-b can be employed. Examples of other stabilizers 112a-b can be stabilizers which rest on the user's ear, stabilizers that connect at the top over the user's head (e.g., the stabilizer 112a connecting to the stabilizer 112b), stabilizers that connect to headwear, such as a hardhat, or stabilizers that clip to a user's hair or a baseball cap, etc.

The stabilizer mounts 114a-b can also slide along a head brace 120 to allow the user to adjust where the stabilizers 112a-b contact the user's head. Each user can have a different shaped head, so allowing adjustment of the location of the stabilizers 112a-b provides a comfortable fit for wearing of the headset computer. The stabilizers 112a-b can be configured to engage or disengage a locking mechanism 122a-b within the stabilizer mount 114a-b. In this manner, the user can wear the headset computer 102 with the stabilizers 112a-b in a comfortable, user selected position.

In one embodiment, the stabilizers 112a-b are made from plastic (e.g., polycarbonate). The plastic can be clear. The stabilizers can be 20 mm wide, 8 mm thick, and 75 mm long. However, the stabilizers can be of many other dimensions as well. The stabilizer mounts 114a-b can be made from plastic, and can also be clear. The stabilizer mounts 114a-b can be 30 mm by 28 mm by 7 mm. The head brace can be made of metal (e.g., magnesium). The head mounted computer overall can have dimensions of 200 mm wide, 240 mm front-to-back, and 50 mm tall. In a compact, storage mode, the head mounted computer can be 160 mm wide by 100 mm front-to-back and 50 mm tall. The head mounted computer can weigh 8 ounces. However, the stabilizers, stabilizer mounts, head mounted computer can be of many other dimensions and/or weights as well.

Figure 2A:
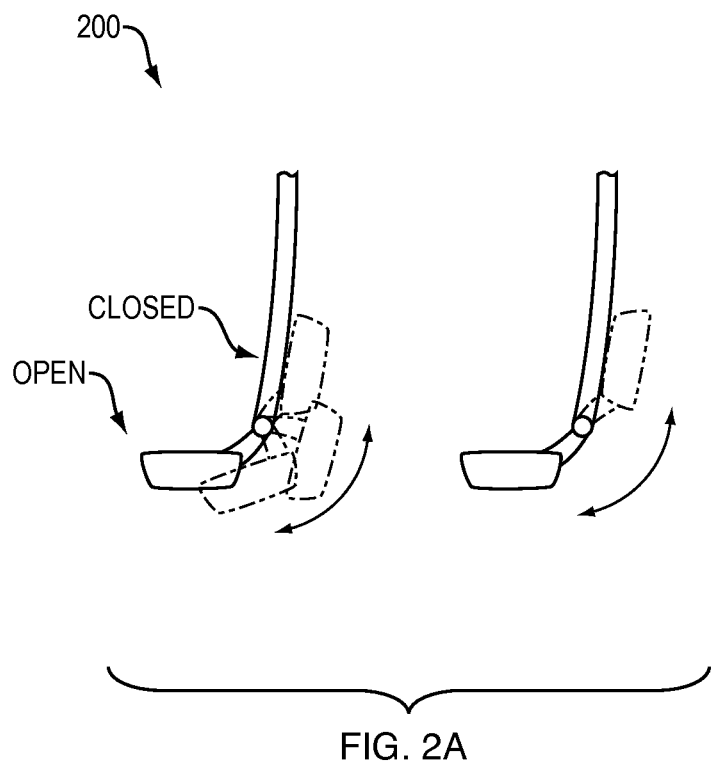
FIG. 2A is a diagram illustrating an example embodiment of the display boom and display from a top perspective.

FIG. 2A is a diagram 200 illustrating an example embodiment of the display boom and display from a top perspective. The display boom can include a combination of pivots and or joints to allow for adjustment of the location of the display. The display can have an open or closed position, as shown by FIG. 2A. The display can also be positioned between the open and closed position.

Figure 2B:
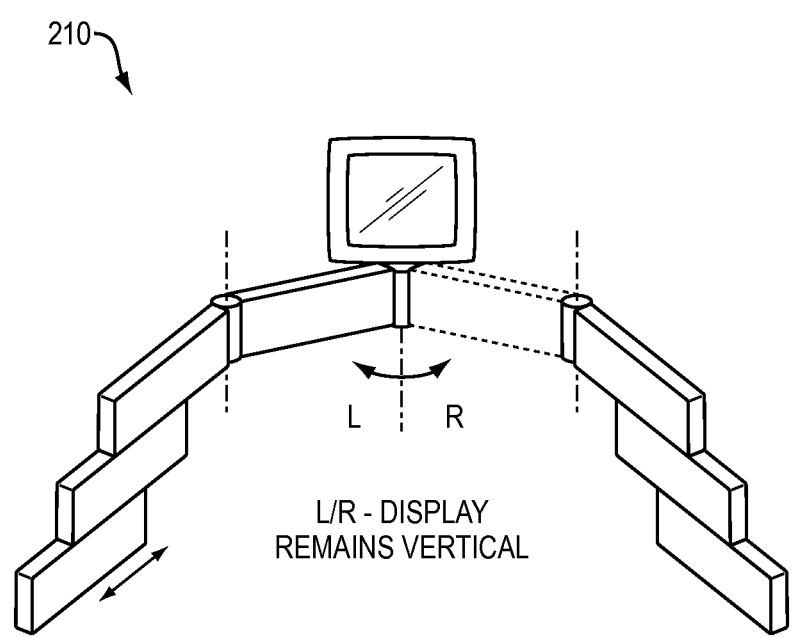
FIG. 2B is a diagram illustrating an example embodiment of the display boom and display.

FIG. 2B is a diagram 210 illustrating an example embodiment of the display boom and display. The display boom can also slide inward and outward using a telescoping boom to adjust the distance between the user's eye and the display. Throughout this process, the display remains vertical. The display can flip 180° and allow the user to flip the entire headset computer. This allows the user to effectively shift the display from the left to right eye, or vice versa, without disconnecting the display and re-connecting it at the other side of the headset computer. The display can be flipped to 180°, and upon turning the headset computer upside down, the display is in position for the opposite eye.

Figure 2C:
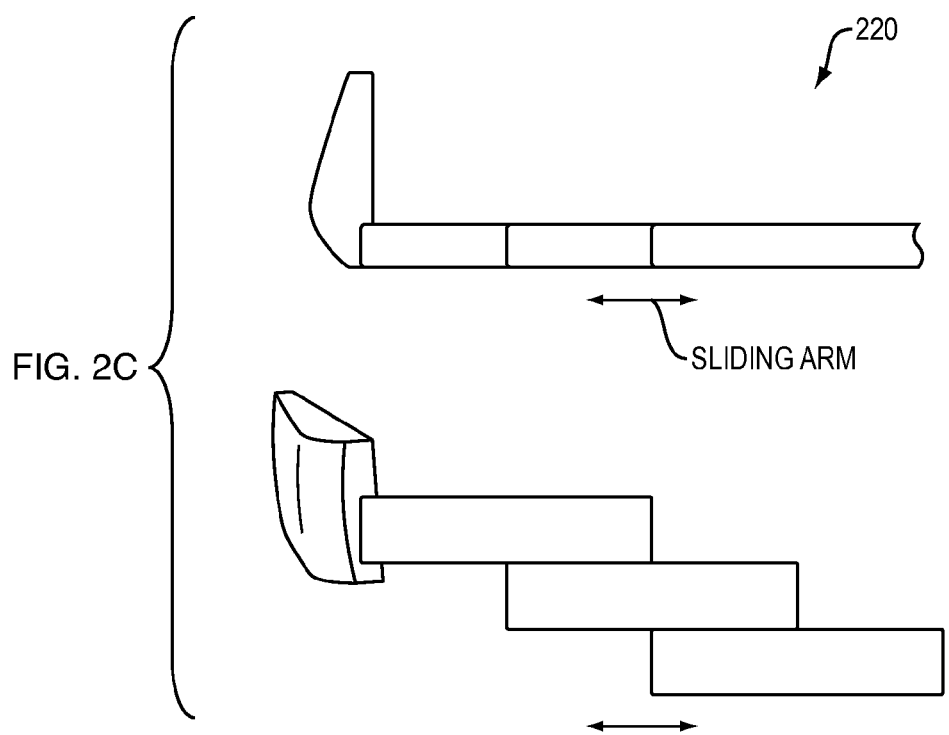
FIG. 2C is a diagram illustrating an example embodiment of the sliding arm of the display.

FIG. 2C is a diagram 220 illustrating an example embodiment of the sliding arm of the display. The sliding arm can move the display away from or closer to the user.

Figure 2D:
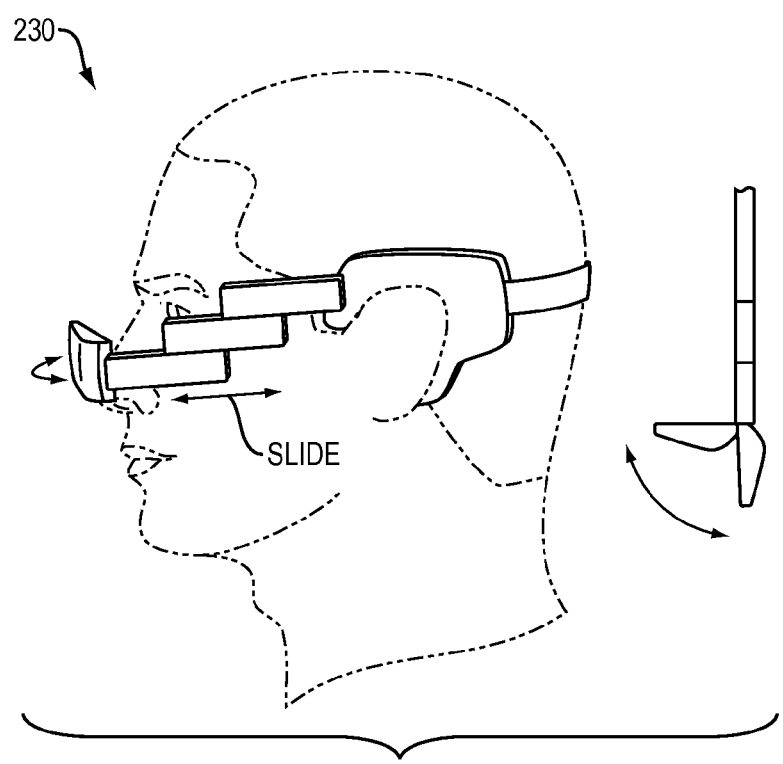
FIG. 2D is a diagram illustrating an example embodiment of a user wearing the headset computer.

FIG. 2D is a diagram 230 illustrating an example embodiment of a user wearing the headset computer. The user can slide the display away from or closer to his or her eye. In addition, the display rotates out and the sliding arm can slide back and forth.

Figure 3A:
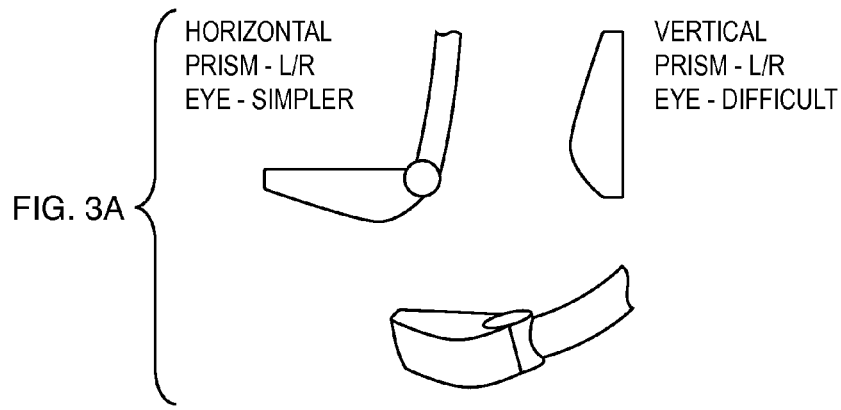
FIG. 3A is a diagram illustrating an example embodiment of horizontal orientation of the display relative to a pivot.

FIG. 3A is a diagram illustrating an example embodiment of a horizontal orientation of the display relative to a pivot. The horizontal orientation makes switching the display from left to right and vice versa simpler than a vertical orientation, also illustrated in FIG. 3A.

Figure 3B:
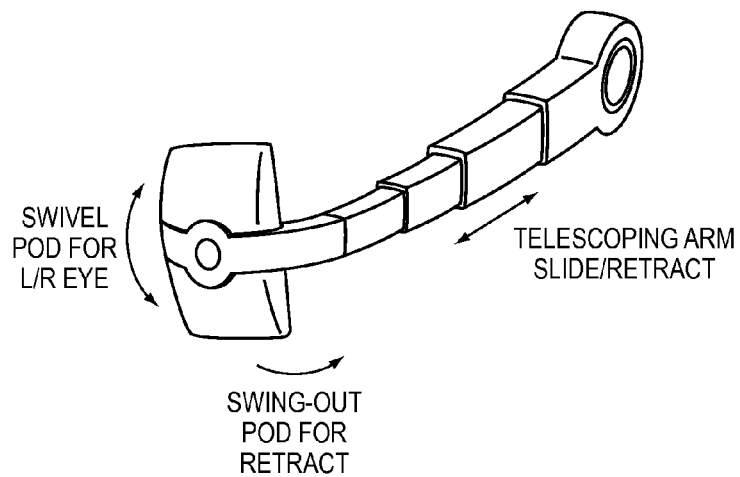
FIG. 3B is a diagram illustrating an example embodiment of the display boom.
Figure 3C:
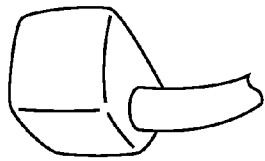
FIGS. 3C-G are diagrams illustrating example embodiments of the display boom including different configurations with multiple pivots that are configured to rotate the display or position the display in different locations.
Figure 3D:
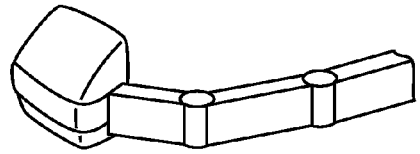
Figure 3E:
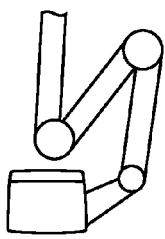
Figure 3F:
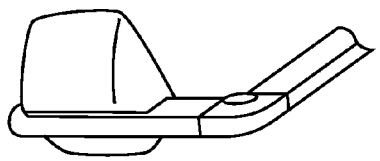
Figure 3G:
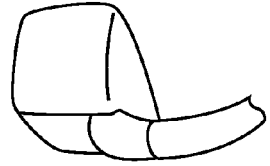

FIG. 3B is a diagram illustrating an example embodiment of the display boom. The display boom includes a telescoping arm that can slide out and retract to move the display closer to and away from the user's eye. The display can also swivel 180° to switch from the left to right eye. This display can also swing out to retract into a retractable position.

FIGS. 3C-G are diagrams illustrating an example embodiments of the display boom including different configurations with multiple pivots that are configured to rotate the display or position the display in different locations.

Figure 4A:
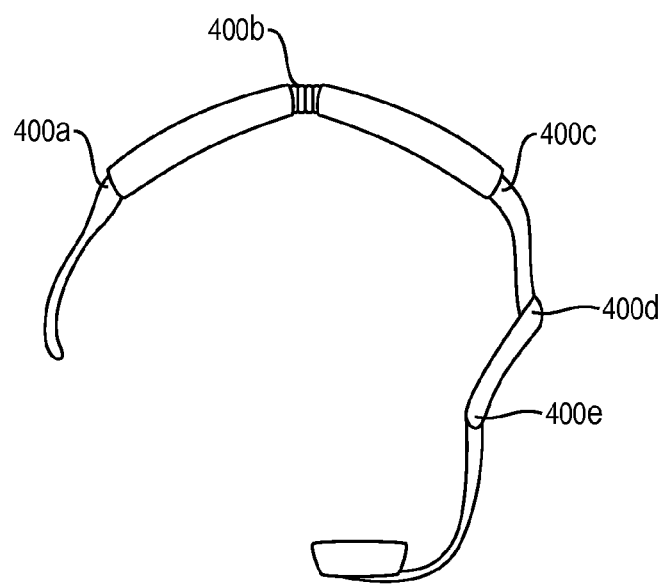
FIG. 4A is a diagram illustrating an example embodiment of the headset computer from a top perspective.

FIG. 4A is a diagram illustrating an example embodiment of the collapsible headset computer from a top perspective. The headset computer includes a plurality of joints 400a-e which allow the headset computer to fold into a storable configuration.

Figure 4B:
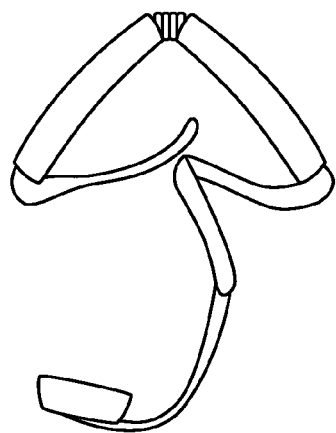
FIG. 4B is a diagram illustrating an example embodiment of the headset computer in a collapsed configuration.

FIG. 4B is a diagram illustrating an example embodiment of the headset computer in a partially folded configuration. By folding the joints 400a-e, the headset computer becomes more compact.

Figure 4C:
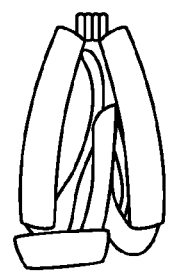
FIG. 4C is a diagram illustrating an example embodiment of the headset computer in another stable configuration.

FIG. 4C is a diagram illustrating an example embodiment of the headset computer in a fully collapsed configuration. In this configuration, the headset computer is completely folded and occupies a smaller volume. This enables easier carrying by the user.

Figure 4D:
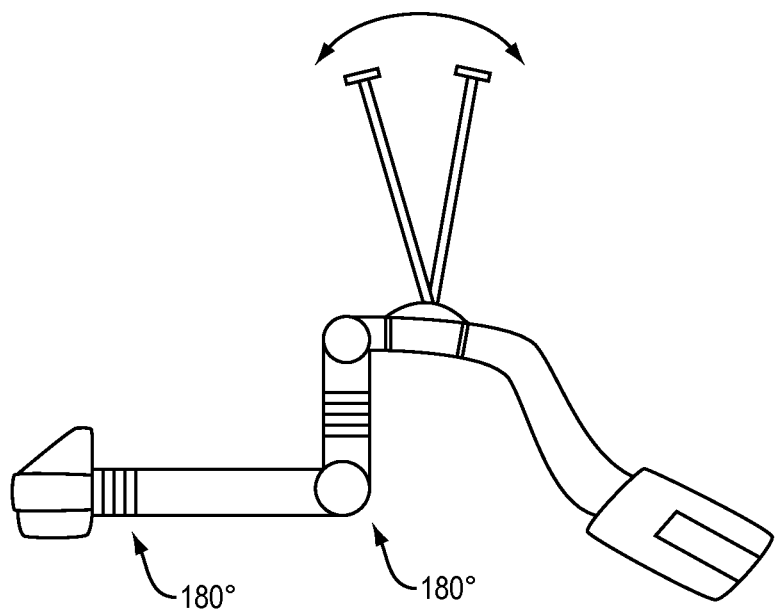
FIG. 4D is a diagram illustrating an example embodiment of the headset computer in a partially folded state.

FIG. 4D is a diagram illustrating an example embodiment of the headset computer in a partially folded state. The headset computer is configured to fold along its body. The headset computer includes an optionally removable head strap, mounts that can rotate up to 180°, and joints that can bend up to 180°. In addition, the display can bend and twist 180° for storage and to flip the display from the left to the right orientation.

Figure 4E:
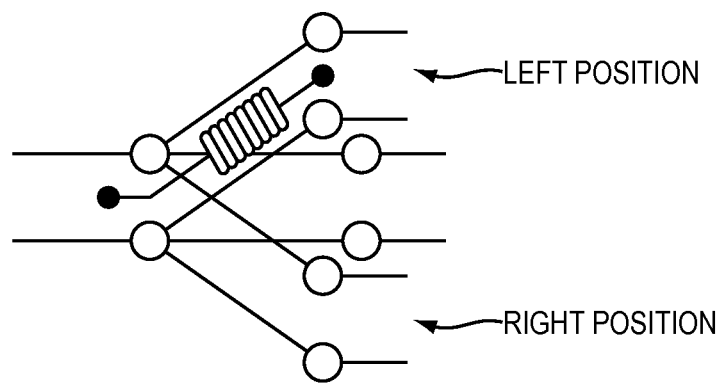
FIG. 4E is a diagram illustrating an example embodiment of a soft bend and twist mechanism that couples the display to the boom.

FIG. 4E is a diagram illustrating an example embodiment of the soft bend and twist mechanism that couples the display to the boom. The mechanism includes a left position and a right position, and additionally a spring that forces the display to be naturally deployed either in the left or right position, but not linger in between the two positions, barring other mechanical forces.

Figure 5:
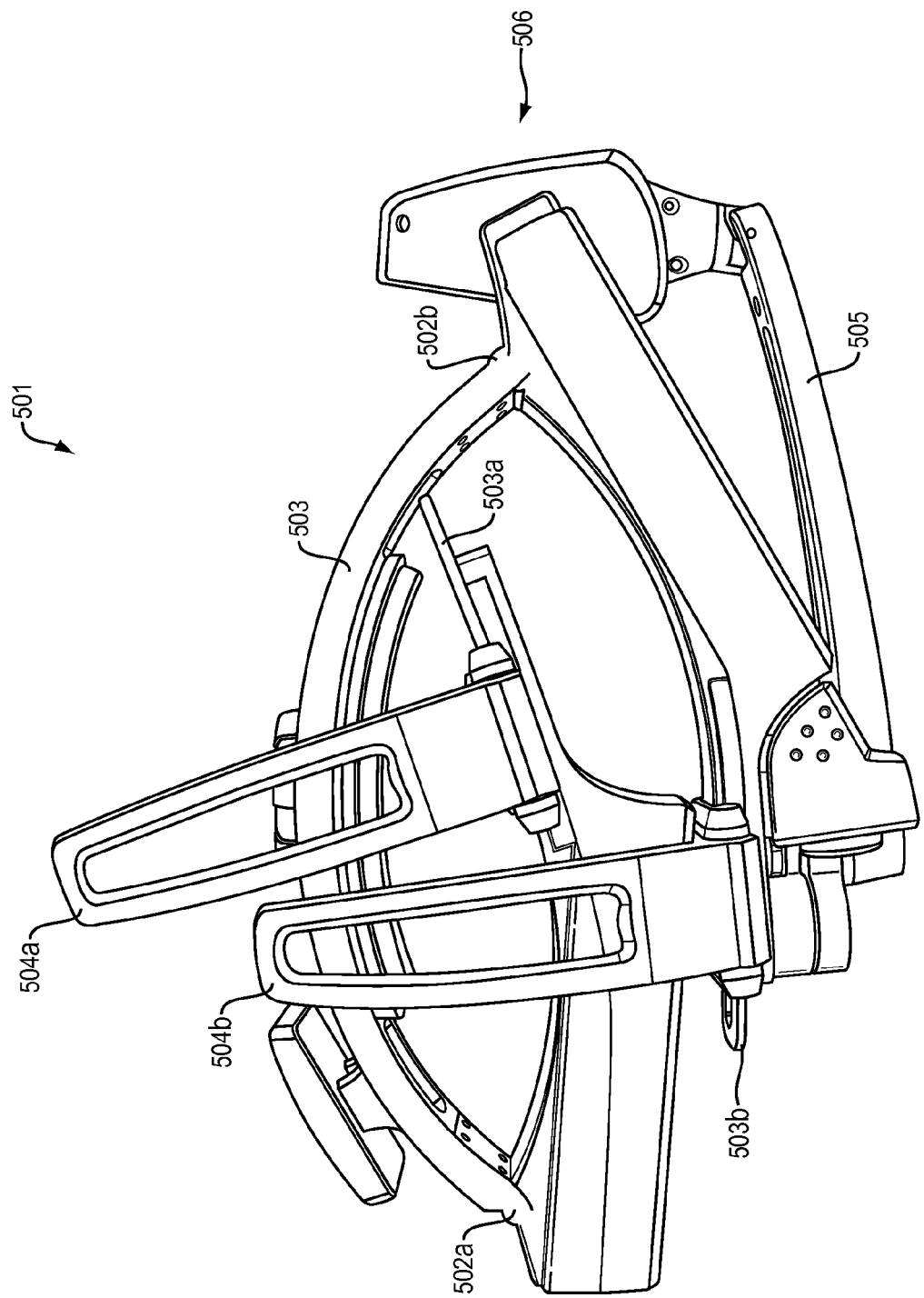
FIG. 5 is a diagram illustrating an example embodiment of the headset computer with two joints in a collapsed form from a top perspective.

FIG. 5 is a diagram illustrating an example embodiment of the headset computer 501 with two joints 502a-b in a collapsed form from a top perspective. Head support beam 503 is configured to wrap around the user's head supported by stabilizers 504a-b. Display beam 505 connects display 506 and to the head support beam 503. In this embodiment, the headset computer 501 joints 502a-b bend in an axis orthogonal to a long axis of the head support beam 503. The two ends 503a-b of head support beam 503 are positioned closer together in the depicted collapsed form than in the headset form shown in FIG. 1.

Figure 6:
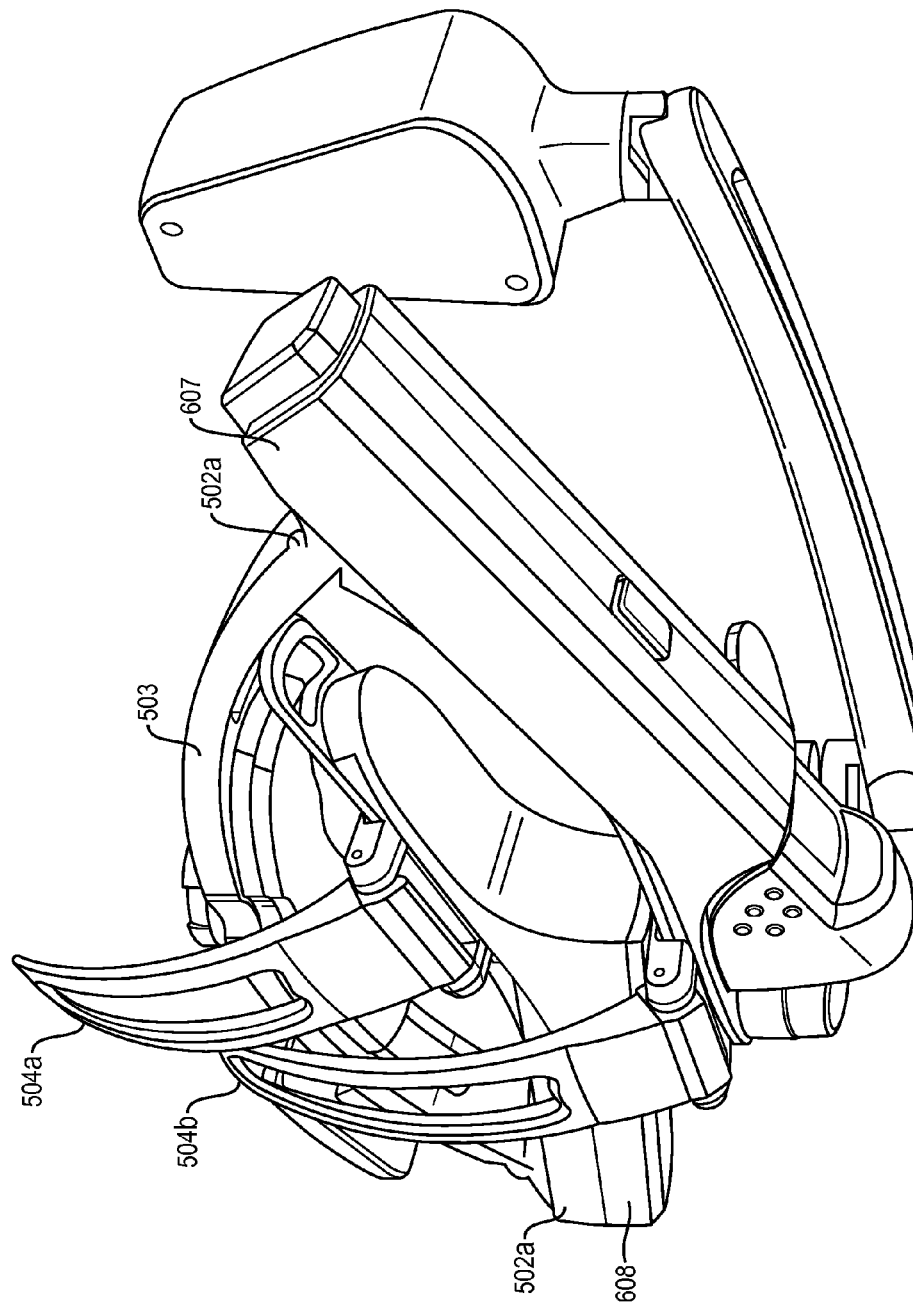
FIG. 6 is a diagram illustrating an example embodiment of the headset computer with two joints in a collapsed form from an angled perspective.

FIG. 6 is a diagram illustrating an example embodiment of the headset computer 501 with two joints 502a-b in a collapsed form from an angled perspective. Support beam 503 is configured to wrap around the users head supported by stabilizers 504a-b. Display beam 505 connects display 506 to support beam 503. Electronics module 607 and power supply 608 are integrated with support beam 503.

Figure 7:
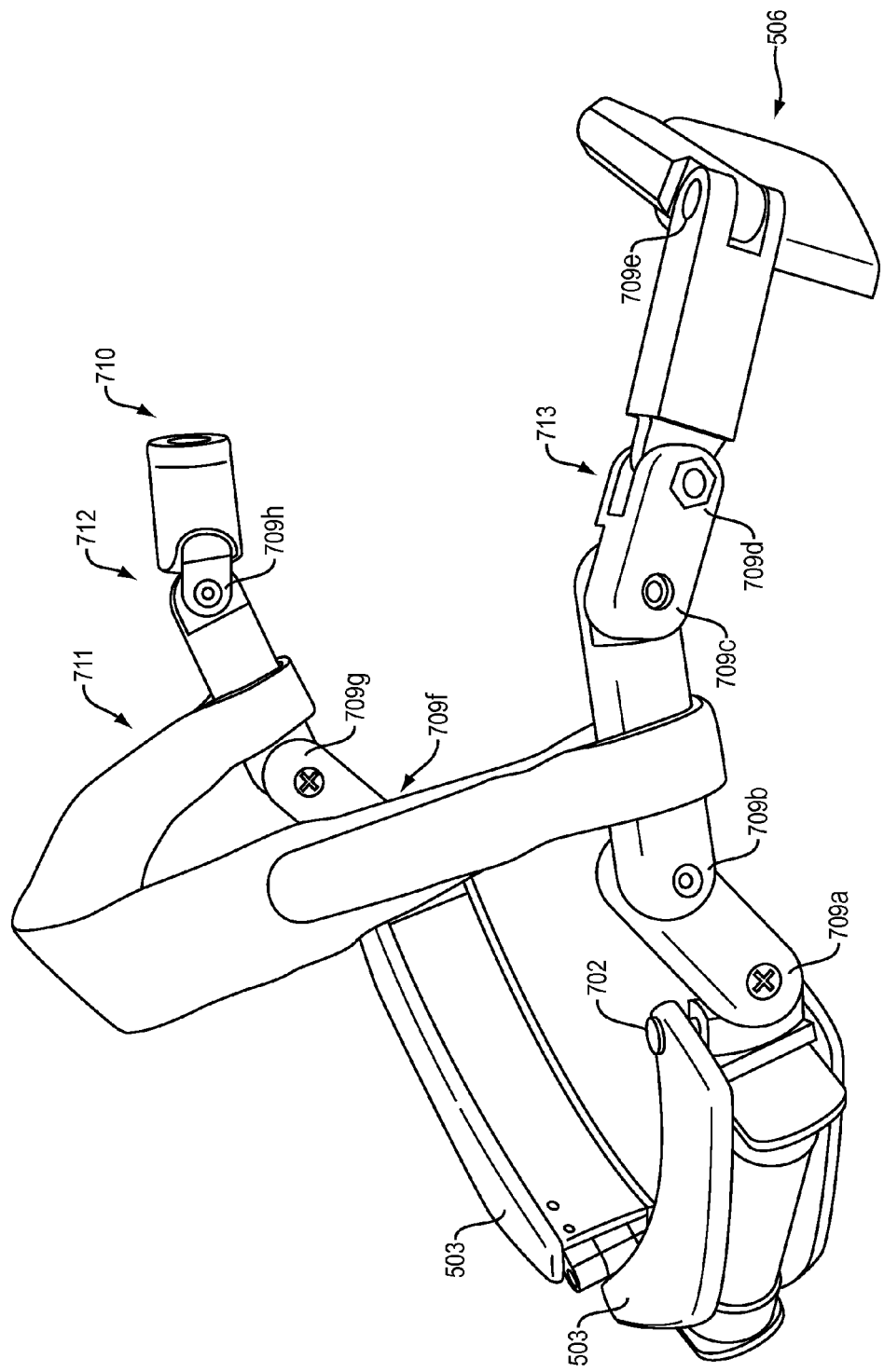
FIG. 7 is a diagram illustrating an example embodiment of the headset computer with multiple joints in a headset form from an angled perspective.
Figure 8:
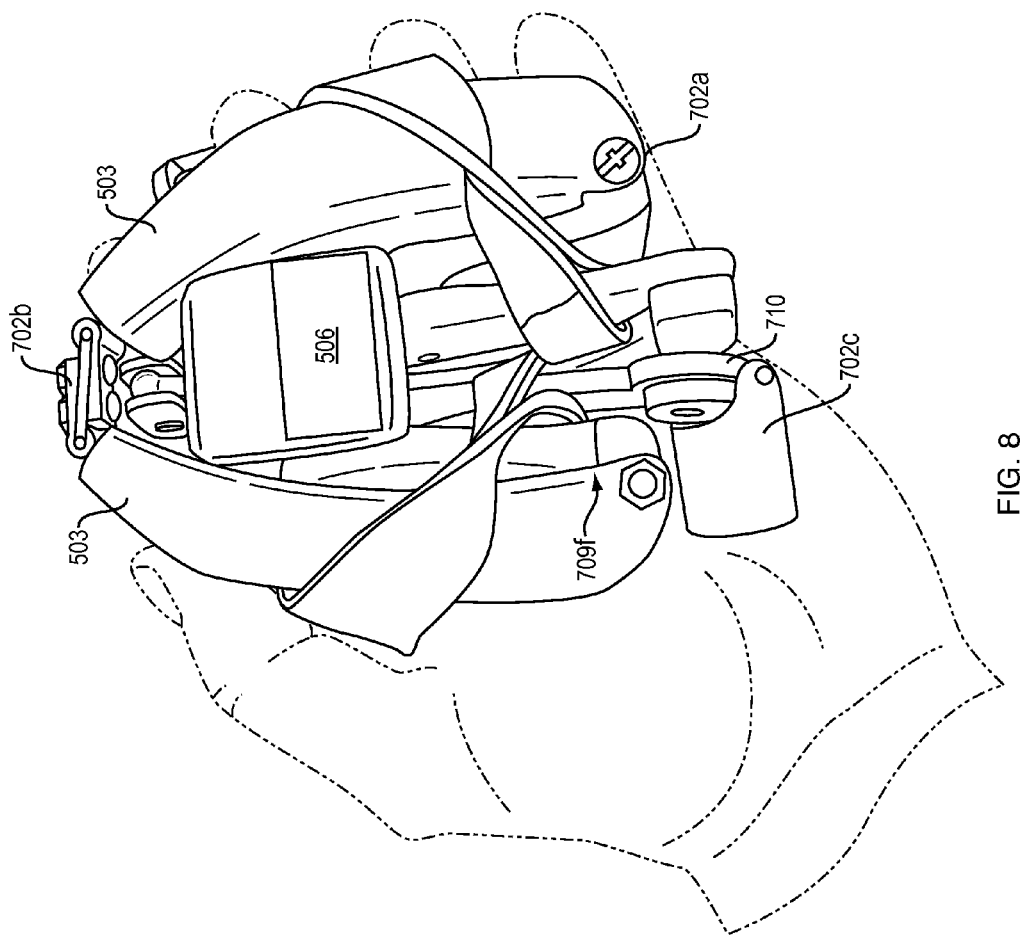
FIG. 8 is a diagram illustrating an example embodiment of the headset computer with multiple joints in a collapsed form.

FIG. 7 a diagram illustrating an example embodiment of the headset computer 501 with 3 head support beam 503 joints 702a-c in a headset form from an angled perspective. Instead of a display beam, display 506 is attached as an accessory to an end of the head support beam at joint 702a. On the other end of the head support beam 503 is a camera 710 accessory mounted at joint 702c. Both the camera and display accessories are mounted by multiple joints 709a-h on support beams 712 and 713 to enable a more compact collapsed form, as shown in FIG. 8. Also in this embodiment, head support beam 503 is secured to the user's head in headset mode using an attached support means, shown here as a flexible strap 711 configured to wrap around the top of the user's head and support the weight of the headset computer 501.

FIG. 8 is a diagram illustrating an example embodiment of the headset computer 501 of FIG. 7 in collapsed form. Joint 702b is bent on an axis orthogonal to the long axis of head support beam 503 to fold the head support beam 503, while joints 702a and 702c are bent on axes orthogonal to the long axis of head support beam 503 to fold the camera support beam 712 and display support beam 713 between the head support beam 503. In this collapsed configuration, display 506 faces outwardly from the headset computer 501, enabling the user to view the display in collapsed form.

Figure 9:
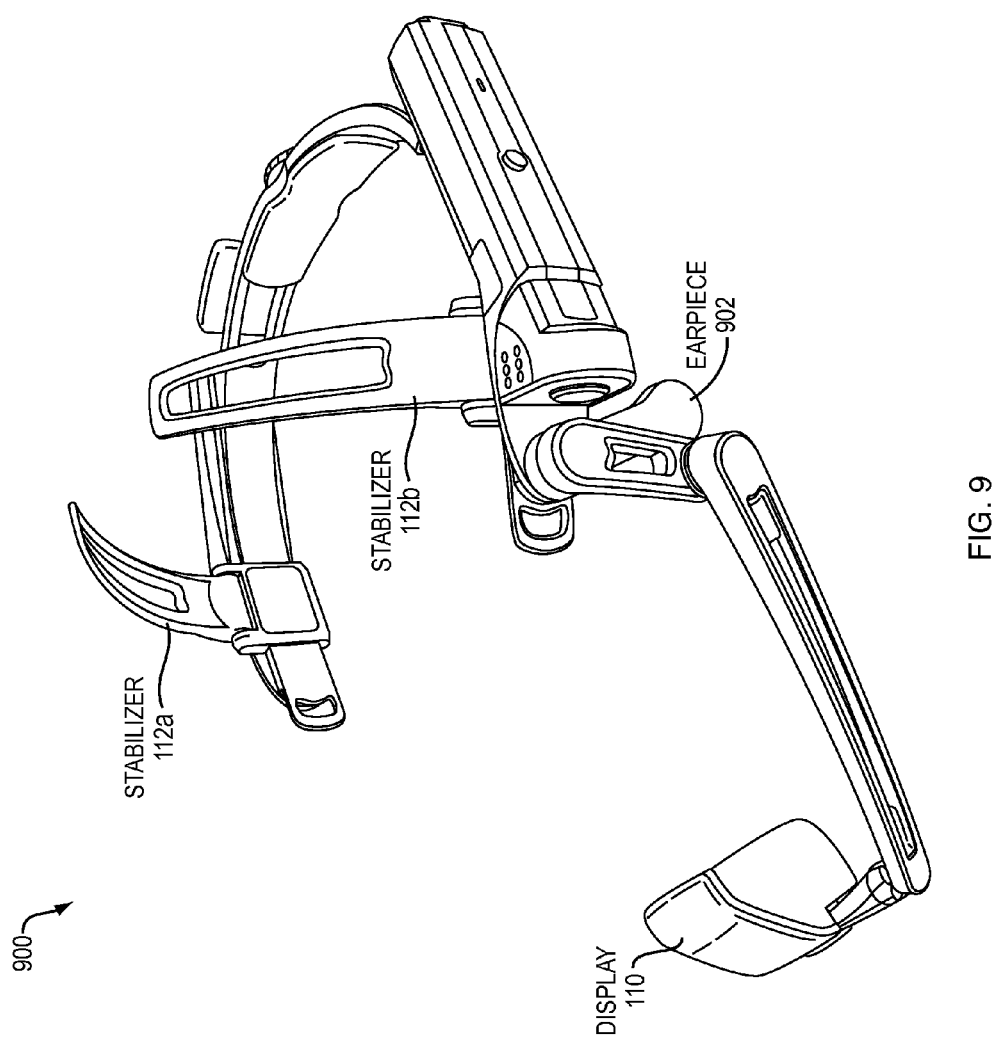
FIG. 9 is a diagram illustrating an example embodiment of the headset computer, including a rotatable earpiece.

FIG. 9 is a diagram 900 illustrating an example embodiment of the headset computer in headset form, including a rotatable earpiece 902.

Figure 10:
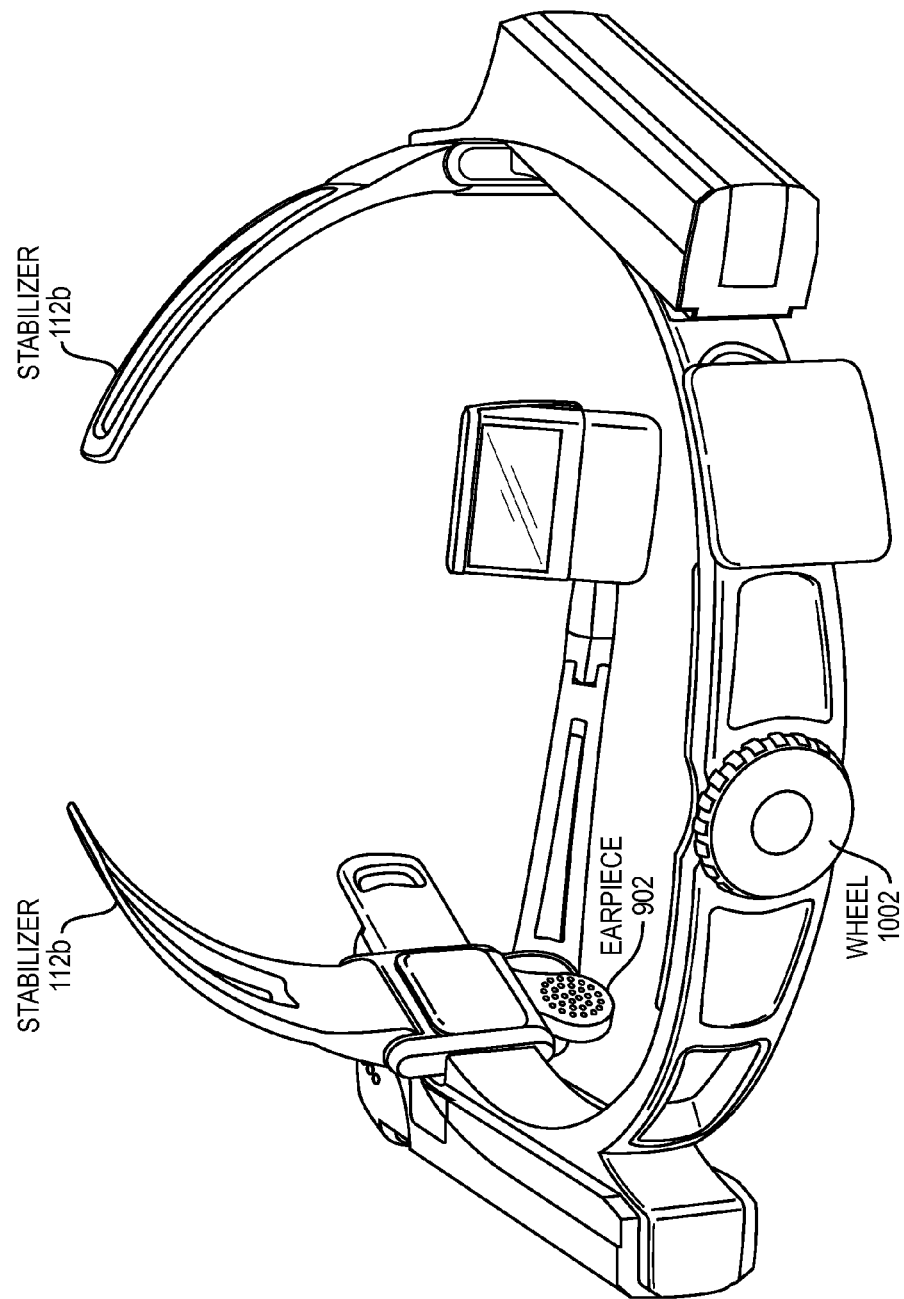
FIG. 10 is a diagram illustrating an example embodiment of the headset computer from a back position.

FIG. 10 is diagram 1000 illustrating an example embodiment of the headset computer from a back position. The headset computer is shown in headset form to be operating and showing a picture of a vehicle on its display 100. In addition, the wheel 1002 in the back can be used to expand or contract the housing/head brace of the headset computer to fit different sized heads.

Figure 11:
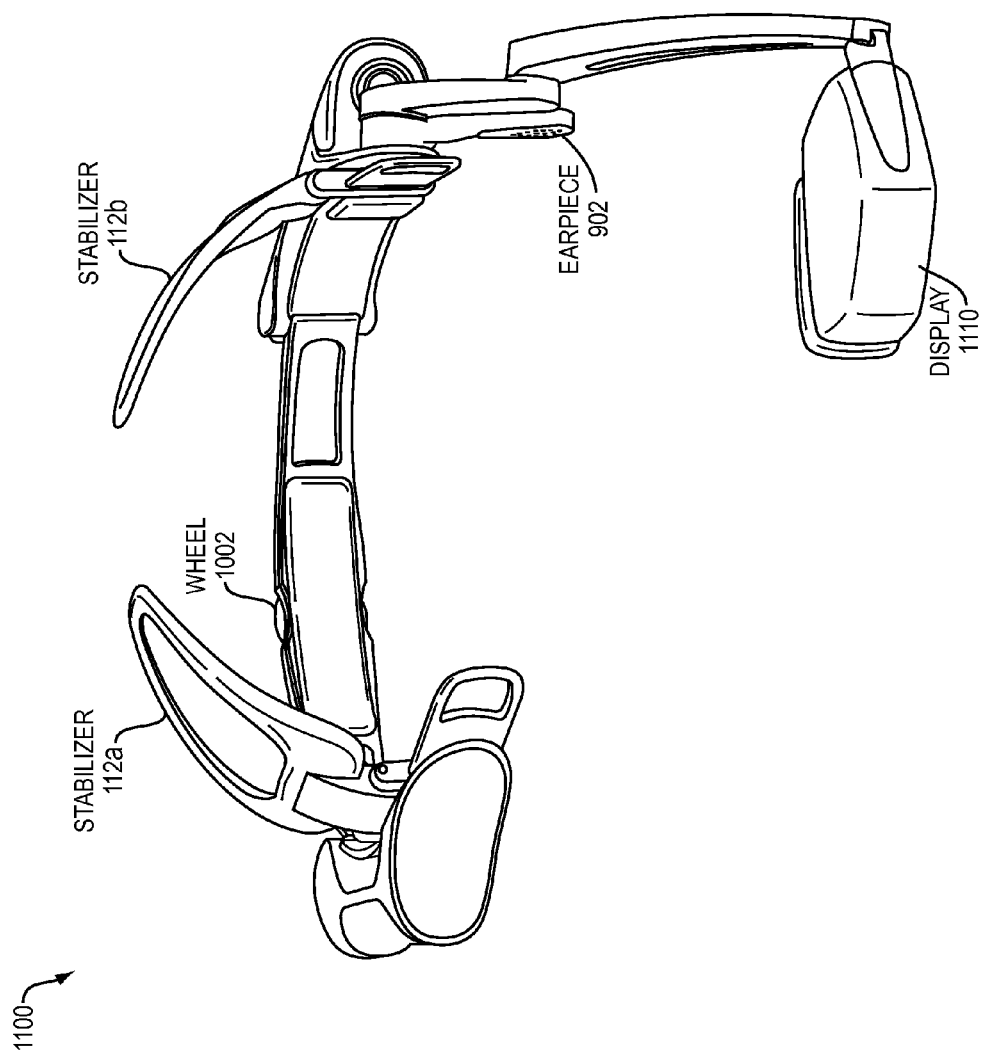
FIG. 11 is a diagram illustrating an example embodiment of the headset computer.

FIG. 11 is a diagram 1100 of an embodiment of the headset computer in headset form. The wheel 1002, as described in FIG. 10, can be seen at the back the headset computer from a different angle. In addition, the embodiment of FIG. 11 employs a horizontal display 1100.

Figure 12:
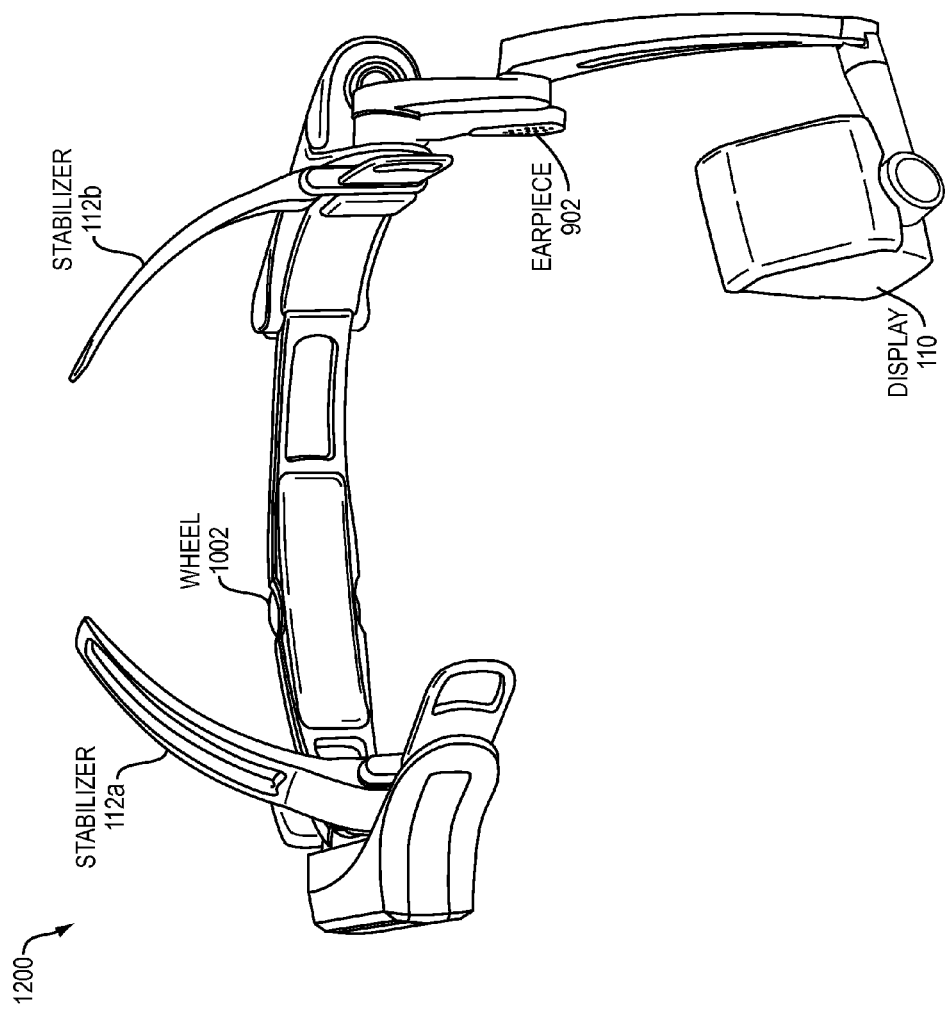
FIG. 12 is a diagram illustrating an example embodiment of the headset computer.

FIG. 12 is diagram 1200 of an embodiment of the headset computer. In this embodiment, the display is a P1B optic display, as shown in FIG. 14.

Figure 13:
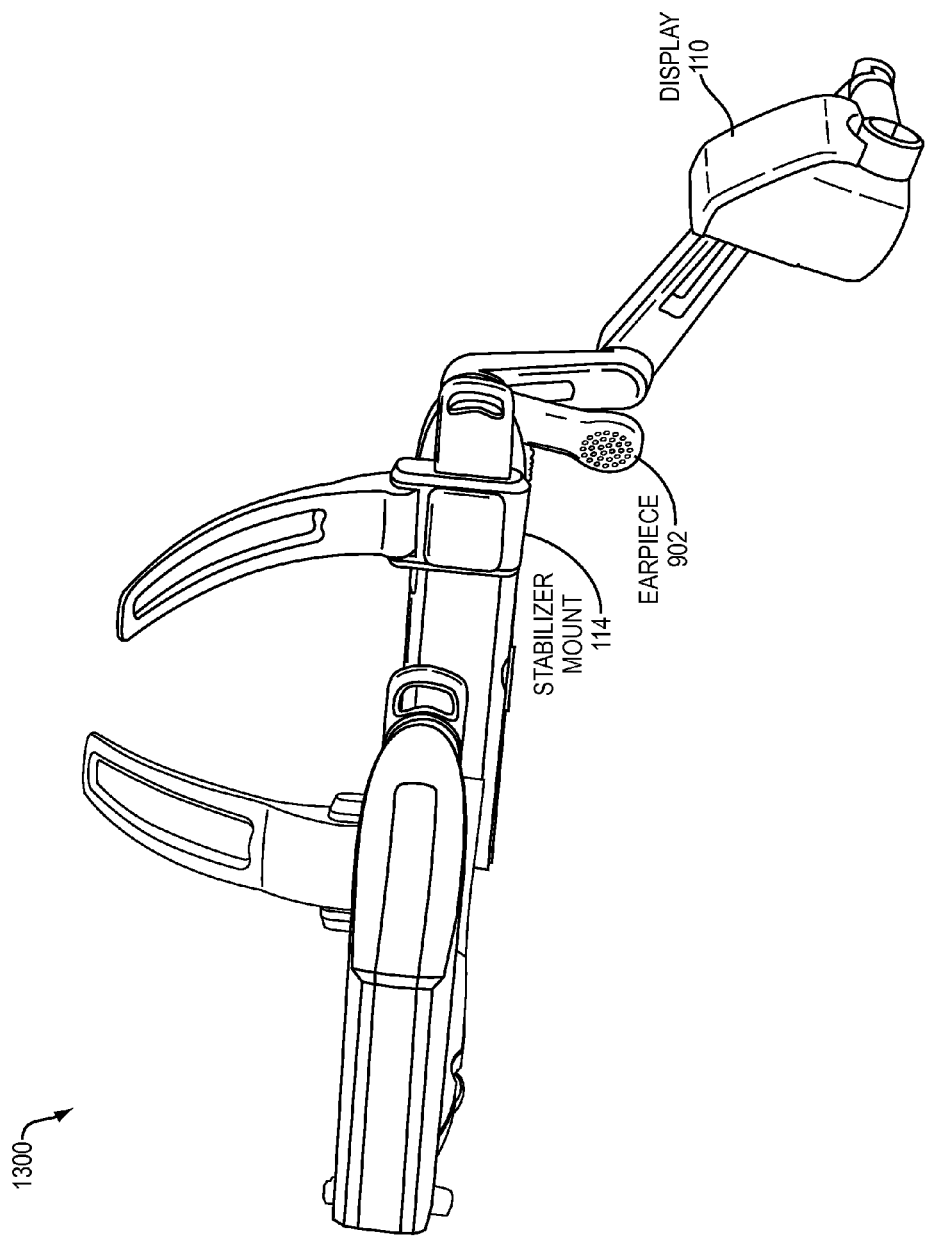
FIG. 13 is a diagram illustrating an example embodiment of the headset computer.

FIG. 13 is a diagram 1300 illustrating an example embodiment of the headset computer. The earpiece 902 can be rotated to flip from a right to left side when the entire headset computer is flipped. This allows the user to clearly hear output of the headset computer.

Figure 14A:
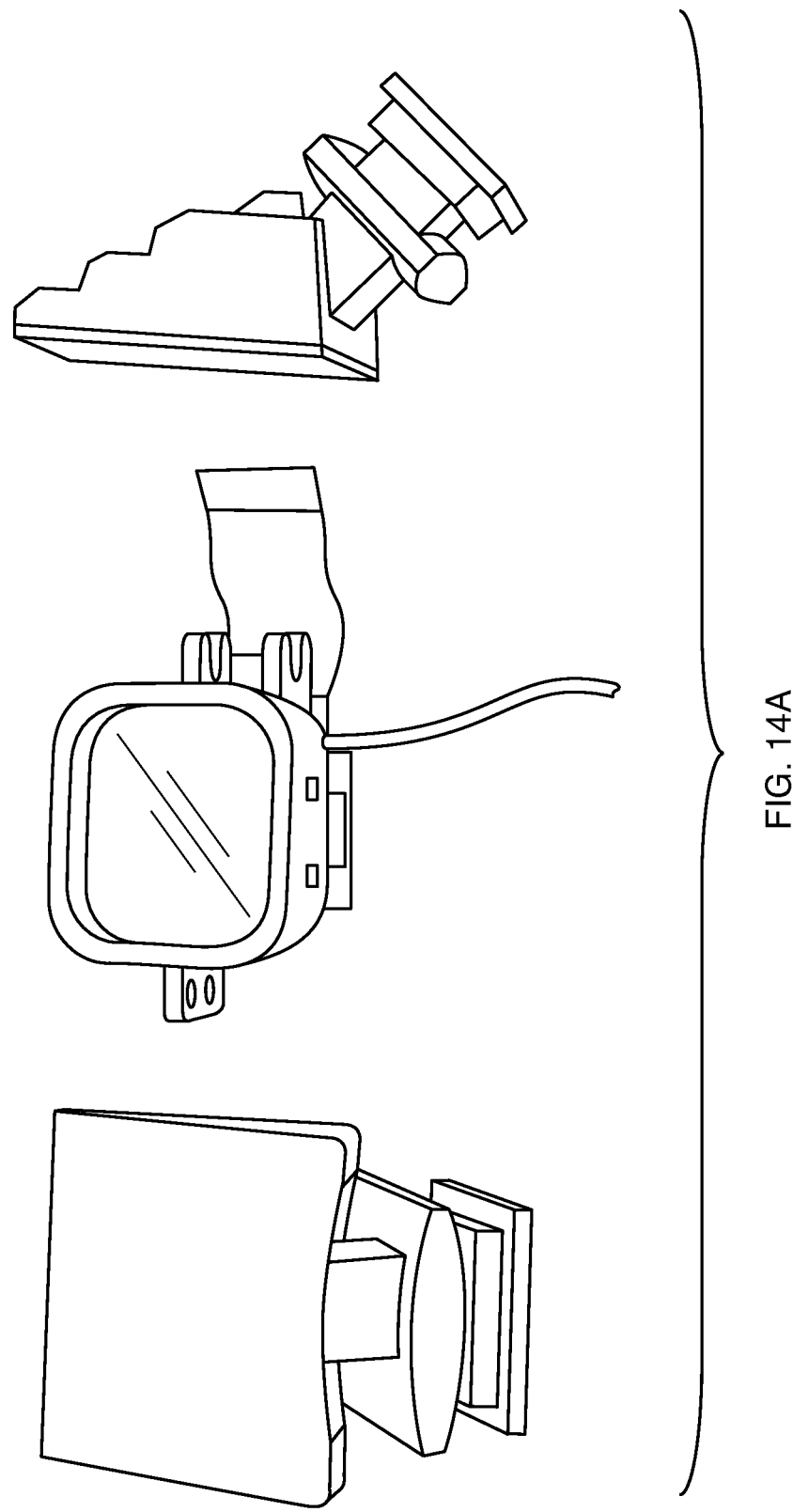
FIGS. 14A-C are diagrams illustrating example embodiments of the P1B optic employed by the headset computer.
Figure 14B:
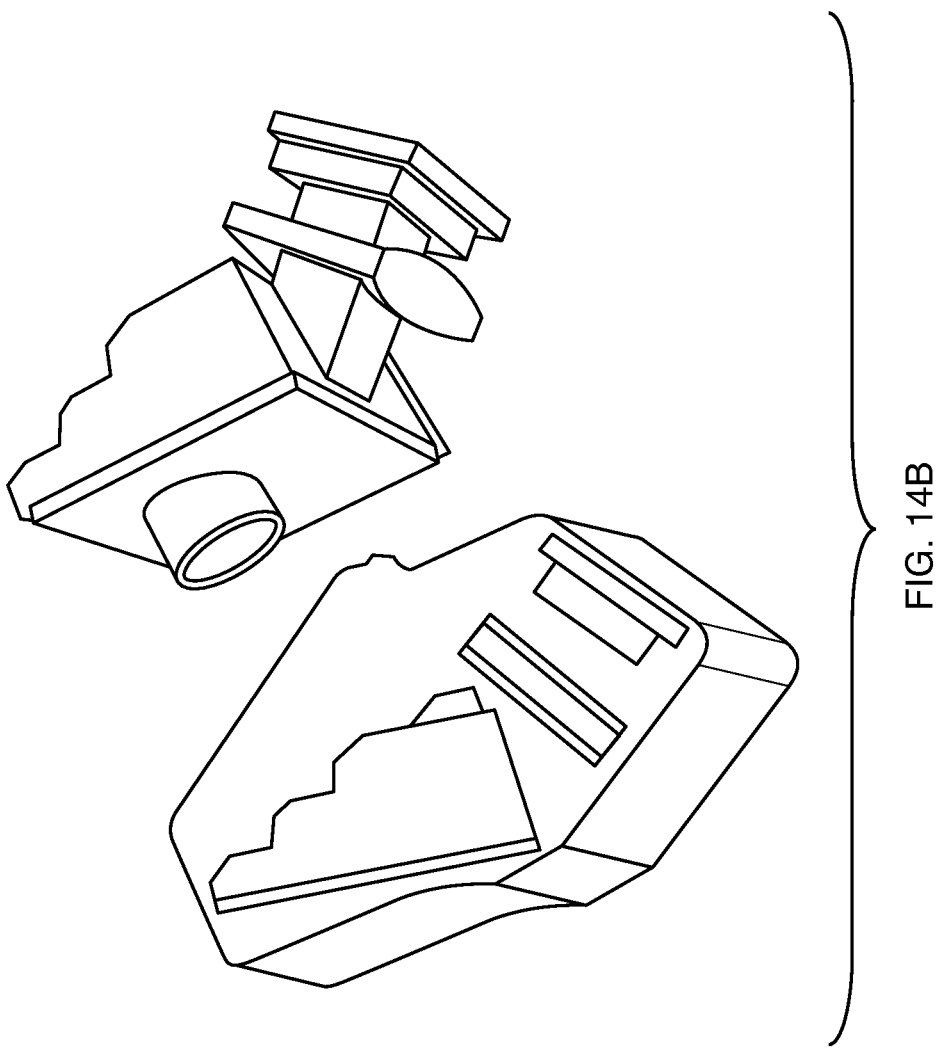
Figure 14C:
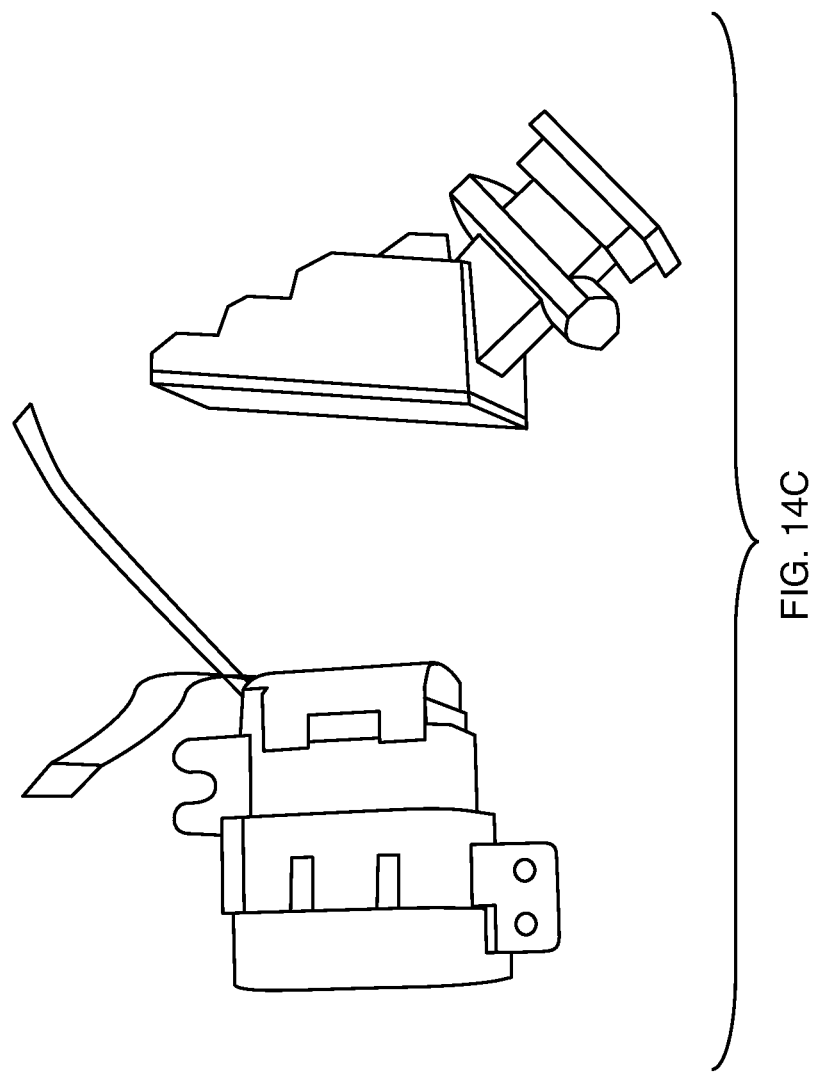

FIGS. 14A-C are diagrams illustrating example embodiments of the P1B optic employed by the headset computer. In addition, FIGS. 14A-C illustrate the mounts that the P1B optic can be housed in the headset computer. Other optics can be used other than the P1B optic.

Figure 15:
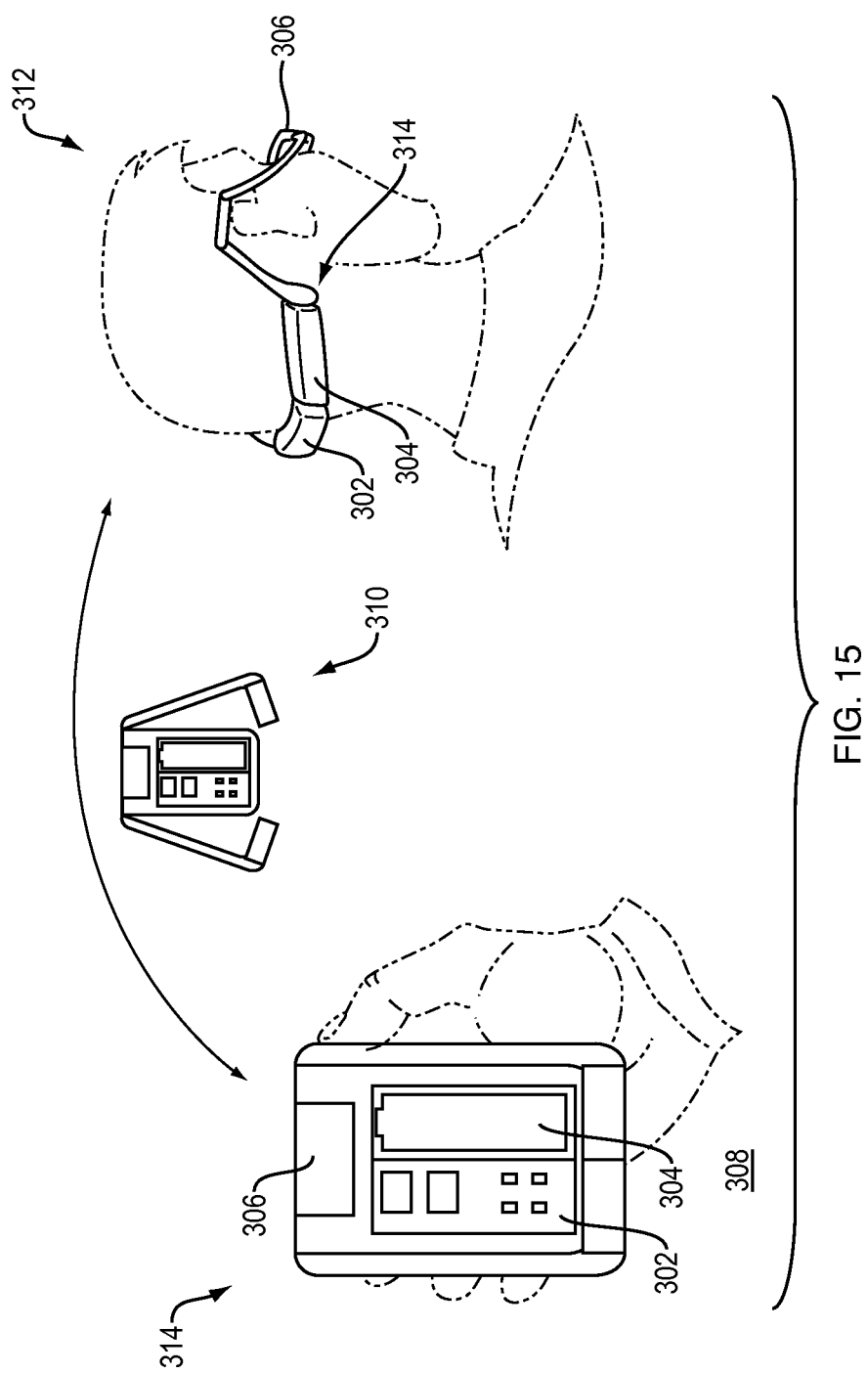
FIG. 15 is a diagram illustrating an example embodiment of different modes of a transforming collapsible headset.

FIG. 15 is a diagram illustrating an example embodiment of different modes of a collapsible headset 314. The transforming headset 314 includes an electronic board and or folded electronics 302, a power source 304, and an optic/display 306. The power source 304 can include a 400 milliamp hour battery although other types of batteries can be employed.

A first mode of the transforming headset 314 is a handheld mode 308. A user can easily hold or stow away the transforming headset in the handheld mode 308 because it is rectangular. In one embodiment, the collapsible headset 314 in handheld mode 308 is the approximate size of a cellular phone or other handheld device. Further, the optic/display 306 can be viewable when the unit is in this mode. The collapsible headset 314 can operate in the handheld mode 308, and the optic/display 306 is operational.

The transformation mode 310 converts the transforming headset 314 from the handheld mode 308 to a head mounted mode 312. The transforming headset 314 is still operational in the head mounted mode 312, and includes the parts as the handheld mode 308. The user, however, can wear the transforming headset 314 in the head mounted mode 312 such that the transforming headset 314 wraps around the user's head and the display is in front of the user's eye, instead of being protected by the foldable casing of the collapsible headset 314. The transformation mode 310 can convert the collapsible headset 314 from the collapsed handheld mode 308 to the headset mode 312.

Figure 16A:
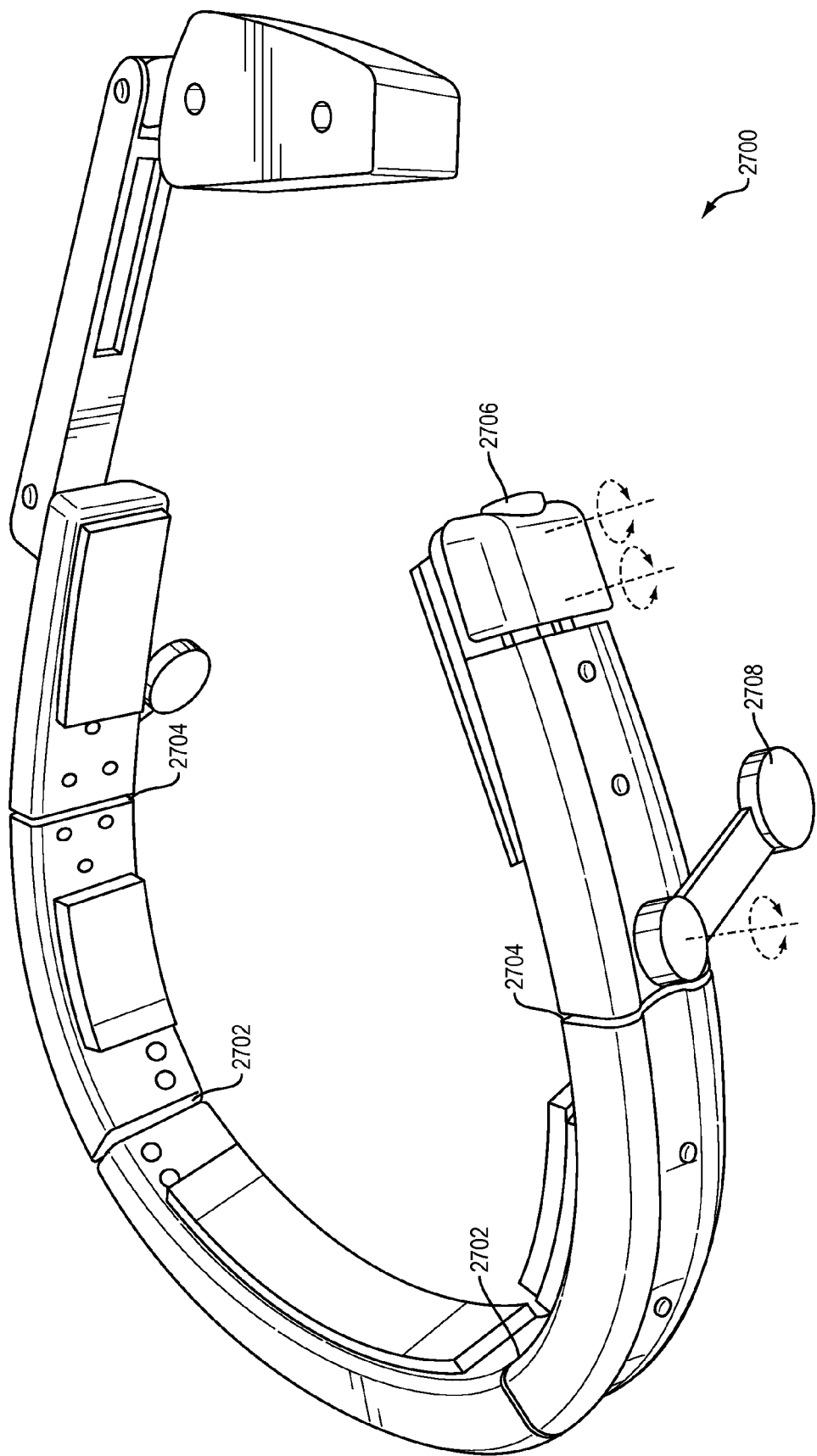
FIG. 16A is a diagram illustrating an example embodiment of a headset computer employed to use inward tension to mount to the user's head.

FIG. 16A is a diagram 2700 illustrating an example embodiment of a headset computer with a head support beam configured to use inward tension to mount to the user's head. The headset computer includes friction hinges 2702, and spring zones 2704 that push the headset inward. Further, the headset includes a rotatable speaker 2708 that allows for sound output to the user. Further, each of the front ends can be coupled to a digital camera or mount for other device, allowing for accessories to be mounted to the headset computer. Further, mounts on each of the front ends of the headset computer can also provide a setup for a strap mount, which holds the headset computer to the user's head in an even more effective manner.

Figure 16B:
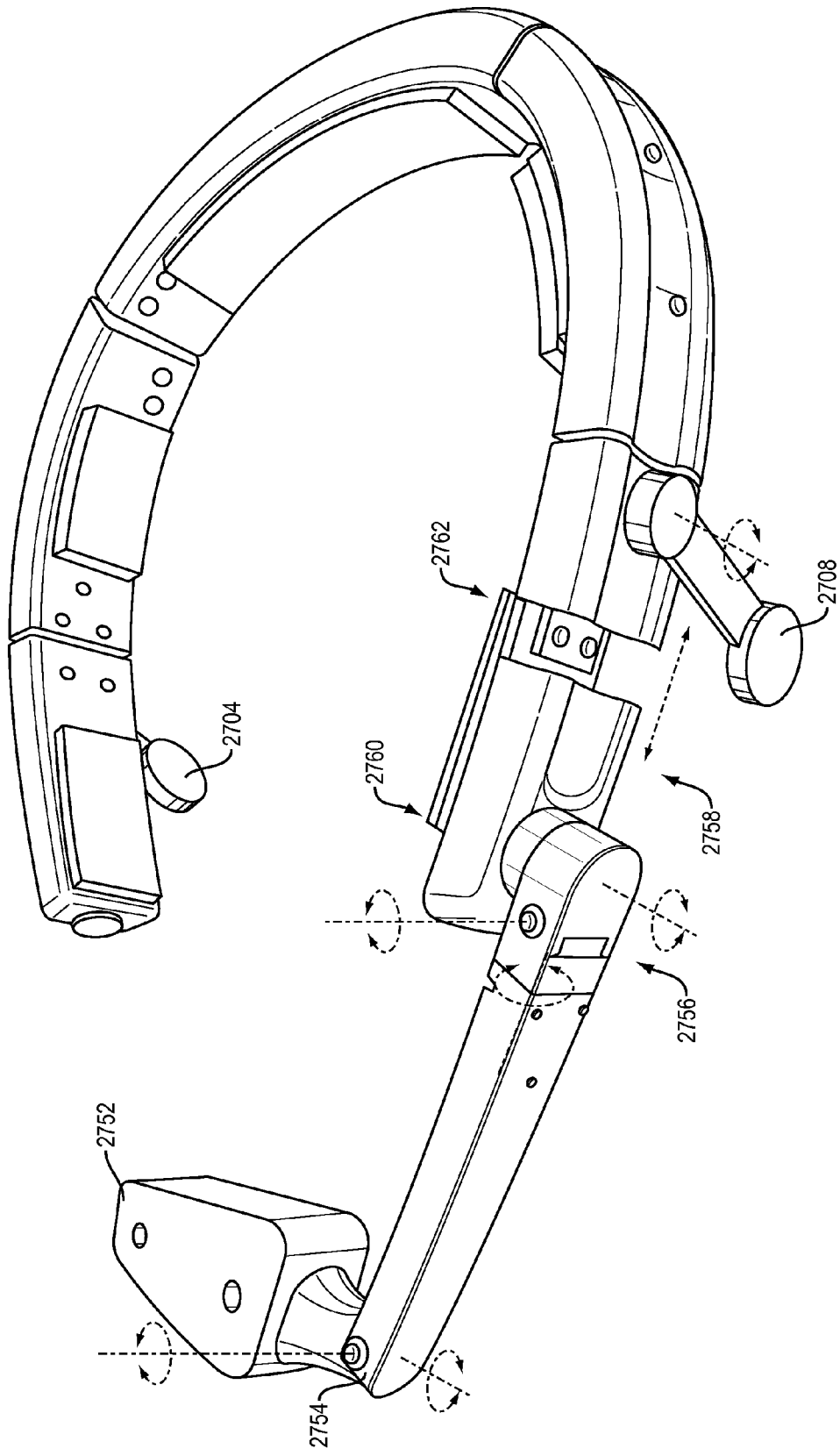
FIG. 16B is a diagram illustrating an example embodiment of the headset computer using inward tension to mount to the user's head.

FIG. 16B is a diagram 2750 illustrating an example embodiment of the headset computer. The speaker 2708, as mentioned above can rotate up to 220°. Further, multiple speakers 2708, 2754, one on both sides to give the user stereo audio. In addition the boom mount 2762 can slide up to 1¼ inches. The boom angle 2760 can rotate 50°. The boom rotation 2758 can be 240°. The boom 2756 can be twisted 25°, and a knuckle 2754 connecting the display to the boom can rotate 45° fore and 20° aft. The optic pod 2752 itself can rotate 60° to 75°.

FIGS. 17A-17B are high-level schematic diagrams of electrical circuits employing near field communications that can be used to transfer data between electronics modules of a collapsible headset computer.

Near field communications (NFC) is a set of standards for establishing radio communications between devices by touching the devices or bringing them into close proximity, usually no more than a few centimeters. Smartphones and similar devices currently employ NFC technology. Present applications include contactless transactions, data exchange, and simplified setup of more complex communications, such as Wi-Fi. Communication is also possible between an NFC device and an unpowered NFC chip, called a "tag".

Recent developments in NFC technology have enabled near-field high speed data transfer, including, for example, a "near-field high speed data transfer technology" (e.g., 375 Mb/sec.). Such NFC technology can be used for convenience in mobile devices; consumers find such high speed downloads or data transfer rates useful for transferring files, particularly for large files, such as movies. The Toshiba Transfer Jet is a NFC technology that provides wireless near-field high speed data transfer, can operate up to a distance of 3.5 centimeters, and has a near-field radiated power dissipation level that is similar to very low power near-field Bluetooth power levels. The Transfer Jet is available from Toshiba America Electronic Components, Inc., 19900 MacArthur Boulevard, Suite 400, Irvine, Calif.

NFC modules can be used as a near-field high speed wireless data transfer to interface between electronics modules or printed circuit boards (PCBs) (also referred to herein as printed circuit board assemblies (PCBAs)). In general, PCBs are used to mechanically support and electrically connect electronic components using conductive pathways, tracks, or signal traces etched from copper sheets laminated onto a non-conductive substrate. Multiple PCBs are typically interconnected using large multi-wire busses or, sometimes, vias are used for "stacked" configurations or for multi-layer boards.

The PCBs of the collapsible headset computer can be equipped with NFC modules. The NFC modules can replace the large multi-wire busses and vias used to interface between multiple PCBs. The NFC module equipped PCBs can be arranged in a stacked configuration (e.g., the PCB are in a parallel configuration) or placed end-to-end (e.g., the PCBs are in a series configuration). NFC modules allow the PCBAs to be placed in a thinner or lower profile stack, because the volume needed for large multi-pin PCBA to PCBA connectors is no longer required.

In whichever arrangement of PCBs is used, a first NFC module is located within a NFC range of a second NFC module to enable an interfacing wireless communications link between the two NFC modules. An example NFC range, such as the Transfer Jet is up to 3.5 centimeters, although the data transmit and reception range can be controlled by system software. Control of operating NFC ranges may be based on particular use and application to optimize a feature of system performance, such as transfer rate or battery life.

For embodiments of a collapsible headset computer that uses two or more NFC interfaces, when the NFC module is used for high speed data transfer between the headset computer and another device, such as a Smartphone or another collapsible headset computer, application software (or operating system instructions) can select a single NFC module as the data transfer point to interface with the other device.

For practical purposes, PCBAs can be sealed to the outside having only a power and/or ground external connection. By equipping individual collapsible headset computer PCBAs with NFC modules, the PCBAs (including the NFC modules) can be more easily hermetically sealed, because there are large number of external connection points of the multi-wire busses and vias have been eliminated. Thus, higher levels of system reliability and system life-span are possible because exposure to dust and moisture are greatly reduced.

NFC modules allow the PCBAs to move or flex within the physical constraints of a system architecture or industrial design free from the possibility of physical damage associated with the multi-wire busses, flex circuit interfaces, or connectors becoming loose or making intermittent contact during vibration or other PCBA to PCBA movement.

Using near field wireless high speed data transfer technology can eliminate large multiple pin connectors on two or more adjoining PCBAs, as well as any high speed multiple wire data bus or flex circuit interfaces. Eliminating the sharp right angle connection of PCBAs to PCBAs and the speed multi-wire bus or cables from PCBA to PCBA can improve and lower high speed system EMI and regional RF emission certifications.

Thus, use of PCBs equipped with NFC modules may allow collapsible headset computers to employ hinges and system housing flex points in its industrial design and be freed from the problems of passing large multi-wire busses or flex circuits interfaces through or about the hinges or flex points.

FIG. 17A is a high-level schematic diagram of circuit 1700, an example embedment of PCBs equipped with NFC modules arranged to be within the near field range of each other and configured to establish a communications link. The circuit 1700 includes a central processing unit printed circuit board assembly 1701 (CPU PCB) and an auxiliary printed circuit board assembly 1711 (AUX PCB). CPU PCB 1701 includes a central processing unit 1703 (CPU) communicatively coupled 1715 to a NFC module 1705. The CPU 1703 can be, for example, an OMAP4430 multimedia application processor available from Texas Instruments Inc., 12500 TI Boulevard Dallas, Tex. For reasons of simplicity, details of the CPU PCB 1703 have been omitted, including, but not limited to: a power companion chip, battery connector, camera connector, USB on-the-go micro-AB connector, PCB temperature sensor, display connector, debug connector, status LEDs, user switches, etc. and communications pathways, such as traces, wires, etc. As such, the CPU PCB 1703 can include any or more of these details.

The AUX PCB 1711 includes an auxiliary module 1703 (AUX) communicatively coupled 1715 to a NFC module 1705. NFC modules 1705 are arranged in close proximity, that is, within an operable near field range of one another. Further, the NFC modules are configured to establish a bi-directional wireless communications link 1750. Such a bi-directional wireless communications link 1750 can be established using any appropriate NFC protocol and/or data exchange format. Although not shown in FIG. 17A for reasons of simplicity, the AUX PCB 1711 can include multiple AUXs 1713, such as an audio codec and mini-DSP module, head tracker module, micro-SD card, power regulators, GPS receivers, wireless communications modules employing protocols such as Wi-Fi, Bluetooth, etc., eMMC embedded storage. The AUX PCB 1711 can not only include additional AUXs 1713, such as those listed above, but also include communications pathways, such as traces, wires, etc. that enable operable coupling.

FIG. 17B is a schematic diagram of the AUX PCB 1711 showing more details of the NFC module 1705. The AUX PCB 1711 includes the AUX module 1713, operable coupling 1715, and NFC module 1705. The NFC module 1705 can include NFC integrated circuit (NFC IC) 1755 and radio frequency (RF) circuit 1760.

FIGS. 18A-18C are example arrangements of PCBs equipped with NFC modules.

FIG. 18A illustrates a series arrangement 1800a (also referred to as end-to-end) of PCBs including CPU PCB 1801 and AUX PCB 1811. The CPU PCB 1801 includes the CPU 1803 and NFC module 1805a. The AUX PCB 1811 includes multiple AUXs 1813 and NFC module 1805b. The NFC modules 1805a,b are arranged to be positioned at an end of their respective PCBs. In other words, a first NFC module 1805a is located at an end, near the edge of the CPU PCB 1801 and a second NFC module 1805b is located at an end, near an edge of the AUX PCB 1811. The CPU PCB 1801 and AUX PCB 1811 are arranged such that the location of each respective NFC module 1805a,b is located within the near field range of its respective communications link partner to enable the wireless transfer of data through communications link 1850.

FIG. 18B illustrates a parallel arrangement 1800b (also referred to as stacked) of PCBs including CPU PCB 1801 and AUX PCB 1811. Similar to FIG. 18A, the CPU PCB 1801 includes the CPU 1803 and NFC module 1805a, and the AUX PCB 1811 includes multiple AUXs 1813 and NFC module 1805b. Unlike the series arrangement 1800a, the in parallel arrangement 1800b the NFC 1805b of AUX PCB 1811 is mounted on the underside so as to enable the NFC modules 1805a,b to be located within the near field range of each other.

FIG. 18C illustrates a series arrangement 1800c of PCBs, including CPU PCB 1801 and AUX PCB 1811, that is similar to series arrangement 1800a but for the CPU PCB 1801 and AUX PCB 1811 each being encased in a housing 1860a,b, respectively. The housings 1860a,b can each be coupled to a joint 1865, enabling the housings 1860a,b and the PCBs respectively encased by each, to rotate about an axis of the joint 1865. The housings 1860a,b and joint 1865a should be designed to enable the NFC modules 1805a,b to be located within the near field range of each other in at least one operational position.

For the sake of simplicity, the example embodiments presented have been limited to embodiments having two printed circuit board assemblies communicating using NFC. However, it should be understood by those of skill in the art that the inventive principle described herein can be applied to any other embodiment including those of any number of additional printed circuit board assemblies.

While this invention has been particularly shown and described with references to example embodiments thereof, it will be understood by those skilled in the art that various changes in form and details may be made therein without departing from the scope of the invention encompassed by the appended claims.

What is claimed is:

1. A collapsible head mounted computer comprising:
   a head support beam including two ends and a plurality of housing units separated by a plurality of joints to enable articulation of the head support beam between a collapsed form and a headset form, wherein:
   in the collapsed form, the plurality of joints fold the two ends inwardly such that the two ends are closer to the head support beam than in the headset form, and
   in the headset form, the head support beam is configured to wrap around a portion of a user's head, the two ends located at the front of the user's head, each of the two ends being on opposite sides of the user's head;
   a display support beam configured to couple with the head support beam at a first end of the display support beam and couple with a display at the second end of the display support beam;
   a central processing printed circuit board (CPUPCB) including a central processing unit (CPU) operatively coupled to a first near field communications (NFC) module within a first of the housing units; and
   an auxiliary printed circuit board (AUXPCB) including one or more auxiliary modules, each auxiliary module operatively coupled to an auxiliary NFC module within a second of the housing units, each auxiliary NFC module arranged to be located within a near field range of the first NFC module or another auxiliary NFC module;
   wherein the first NFC module and each auxiliary NFC module is configured to establish an NFC link to another adjacent NFC module and the first NFC module and each auxiliary NFC module is housed by respective housing units of the head support beam and separated by at least one of the plurality of joints.

2. The collapsible head mounted computer of claim 1, wherein a portion of a user's head includes at least one of the top of the user's head and the back of the user's head.

3. The collapsible head mounted computer of claim 1, further comprising:
   an electronics module including a processor and a memory coupled to the head support beam.

4. The collapsible head mounted computer of claim 1, further comprising:
   a power source module coupled to the head support beam.

5. The collapsible head mounted computer of claim 1, further comprising:
   a support device attached to the head support beam configured to secure the head support beam to the user's head.

6. The collapsible head mounted computer of claim 1, wherein the collapsed form of the head support beam is further configured to present the display outwardly.

7. The collapsible head mounted computer of claim 1, wherein the head support beam is a user adjustable length.

8. The collapsible head mounted computer of claim 1, wherein the display support beam is a user adjustable length.

9. The collapsible head mounted computer of claim 1, further comprising:
   at least two mounts, each mount at a corresponding end of the head support beam.

10. The collapsible head mounted computer of claim 9, wherein each of the two mounts are configured to mount an accessory.

11. The collapsible head mounted computer of claim 10, wherein the accessory includes at least one of a camera, sensor, microphone, and illumination device.

12. A method of displaying visual information to a user, comprising:
   connecting a display to a first end of a display support beam;
   coupling a second end of the display beam to a head support beam, the head support beam including two ends and a plurality of housing units separated by a plurality of joints to enable articulation of the head support beam between a collapsed form and a headset form, wherein:
   in the collapsed form, the plurality of joints fold the two ends inwardly such that the two ends are closer to the head support beam than in the headset form, and
   in the headset form, the head support beam is configured to wrap around a portion of a user's head, the two ends located at the front of the user's head, each of the two ends being on opposite sides of the user's head;

displaying visual information to the user on the display;

operatively coupling a central processing printed circuit board (CPUPCB) including a central processing unit (CPU) to a first near field communications (NFC) module within a first of the housing units;

operatively coupling an auxiliary printed circuit board (AUXPCB) including one or more auxiliary modules, each auxiliary module operatively coupled to an auxiliary NFC module within a second of the housing units;

arranging each auxiliary NFC module to be located within a near field range of either the first NFC module or another auxiliary NFC module;

housing the first NFC module and each NFC auxiliary module in respective housing units of the head support beam such that the first NFC module and each auxiliary NFC module are separated by at least one of the plurality of joints; and establishing an NFC link between each NFC module configured adjacent to another NFC module.

13. The method of claim 12, wherein a portion of a user's head includes at least one of the top of the user's head and the back of the user's head.

14. The method of claim 12, further including:
attaching a power source module to the head support beam.

15. The method of claim 12, further including:
attaching an electronics module including a processor and a memory to the head support beam.

16. The method of claim 12, further including:
providing a support device on to the head support beam configured to secure the head support beam to the user's head.

17. The method of claim 12, wherein the head support beam is further configured to have a folded form allowing hand-held operation of the display screen.

18. The method of claim 12, wherein the head support beam is a user adjustable length.

19. The method of claim 12, wherein the display support beam is a user adjustable length.

20. The method of claim 12, further comprising:
providing at least two mounting points, each mounting point at a corresponding end of the head support beam.

21. The method of claim 20, wherein each of the two mounts are configured to mount an accessory.

22. The method of claim 21, wherein the accessory includes at least one of a camera, sensor, microphone, and illumination device.

* * * * *